US006999445B1

(12) United States Patent
Dmitriev et al.

(10) Patent No.: US 6,999,445 B1
(45) Date of Patent: Feb. 14, 2006

(54) MULTIPLE ACCESS COMMUNICATION SYSTEM USING CHAOTIC SIGNALS AND METHOD FOR GENERATING AND EXTRACTING CHAOTIC SIGNALS

(75) Inventors: Alexander Sergeevich Dmitriev, Moscow (RU); Sergey Olegovich Starkov, Obninsk (RU); Maxim Evgenyevich Shirokov, Moscow Region (RU); Andrey Ivanovich Panas, Moscow Region (RU); Yong Li, Kanata (CA); Wen Tong, Ottawa (CA); Rui R. Wang, Ottawa (CA)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/979,834

(22) PCT Filed: May 27, 1999

(86) PCT No.: PCT/RU99/00175

§ 371 (c)(1),
(2), (4) Date: Nov. 27, 2001

(87) PCT Pub. No.: WO00/074331

PCT Pub. Date: Dec. 20, 2002

(51) Int. Cl.
*H04L 27/00* (2006.01)

(52) U.S. Cl. .................... 370/342; 370/335; 375/130
(58) Field of Classification Search ............... 370/342, 370/203, 335, 537, 320, 341–344, 328–329, 370/441, 442; 375/130, 134–137, 140
See application file for complete search history.

(56) References Cited

U.S. PATENT DOCUMENTS

| 5,321,409 | A | * | 6/1994 | Walker | 342/202 |
|---|---|---|---|---|---|
| 5,891,383 | A | * | 4/1999 | Joseph | 264/407 |
| 5,923,760 | A | * | 7/1999 | Abarbanel et al. | 380/34 |
| 5,963,406 | A | * | 10/1999 | Neiger et al. | 361/42 |
| 6,400,996 | B1 | * | 6/2002 | Hoffberg et al. | 700/83 |
| 6,418,424 | B1 | * | 7/2002 | Hoffberg et al. | 706/21 |
| 6,717,992 | B1 | * | 4/2004 | Cowie et al. | 375/316 |
| 6,912,240 | B1 | * | 6/2005 | Kumar et al. | 375/130 |
| 2002/0125892 | A1 | * | 9/2002 | Parker et al. | 324/536 |
| 2003/0007638 | A1 | * | 1/2003 | Carroll | 380/263 |

OTHER PUBLICATIONS

Dmitriev, A.S., et al., "Dynamic chaos: A paradigm for modern communication systems", *Foreign Radioelectronics. Advances in Modern Radioelectronics*, No. 10, pp. 13-14 (1997).
Ott, et al., "Controlling Chaos", *Physical Review Letters*, vol. 64, No. 11, pp. 1196-1199 (Mar. 12, 1990).
Schweizer, H., "Multiple access communications using chaotic signals", *IEEE International Symposium on Circuits and Systems, May 12-15, 1996*, XP00068835 New York, US ISBN: 0-7803-3074-9, pp. 108-111 (May 12, 1996).

(Continued)

*Primary Examiner*—Ajit Patel
*Assistant Examiner*—Binh Q Nguyen
(74) *Attorney, Agent, or Firm*—Schwegman, Lundberg, Woessner & Kluth, P.A.

(57) ABSTRACT

A multiple access telecommunication system is provided, which makes use of chaotic signals. Each transmitter has a chaotic system, which has at least one strange attractor in its phase space, and each receiver has chaotic systems, which corresponds to those in the transmitters from which it may receive signals. Each pair of users is assigned a set of periodic unstable orbits from a strange attractor, which that pair of users may use for signalling. At the transmitter side, a multiplexer receives data from plurality of users. These data are multiplexed in time, to produce an asynchronous data stream. The data stream is then mapped to a sequence of chaotic signals, in accordance with the set of trajectories for each transmitter and receiver pair.

50 Claims, 23 Drawing Sheets

OTHER PUBLICATIONS

Shirokov, "Multiple access communicaitons scheme on chaotic carriers", *Journal of Communications Technology and Electronics*, vol. 44, No. 5, XP000878836 Moscow, pp. 543-550 (May 1999).

Sobiski, T., "PDMA-1: Chaotic communication via the extended Kalman filter", *IEEE Transactions on Circuits and Systems I*, vol. 45, No. 2, XP000771361 New York, pp. 194-197 (Feb. 1998).

* cited by examiner

MULTIPLE ACCESS COMMUNICATION SYSTEM USING CHAOTIC SIGNALS AND METHOD FOR GENERATING AND EXTRACTING CHAOTIC SIGNALS

The present invention relates to a multiple access communication system using chaotic signals, and more particularly to a multiple access communication system having a chaotic signal generating unit at a transmitting side and a chaotic signal receiver at a receiving side, and methods for generating chaotic signal sequences and extracting chaotic signals from received chaotic signal sequences.

BACKGROUND OF THE INVENTION

At present, many different methods of communication are known to utilize a multiple access mode. These methods are realized in systems with frequency, time or code division of channels. Such systems are called Frequency Division Multiple Access (FDMA) systems, Time Division Multiple Access (TDMA) systems, and Code Division Multiple Access (CDMA) systems, respectively.

Each of these systems has its own advantages and disadvantages. For example, FDMA systems easily provide a necessary channel by means of tuning the receiving filter at the necessary frequency. However, a reverse side of this advantage is the limitation on additional channels due to the bounded operation bandwidth. TDMA systems allow communications even at the same frequency by means of sequential transmission of information fragments from different users. However, in this case there is also the same limitation as in FDMA systems on the number of the channels due to a finite length of the transmission slot that is repeated with a predetermined period. CDMA systems allow increase in the transmission rate. However, these systems also have the limitation on the number of channels due to the use of pseudo-random sequences (PRS) for individual code forming, because the number of such PRS is finite. As a rule, in these communication systems, the channel division methods are used together.

Furthermore, another problem in those systems is difficulties in forming an asynchronous data sequence since, in actual practice, data from numerous users come to a transmission station of such a system at arbitrary moments. In TDMA systems, a sequential transmission of information fragments is performed. The information fragments come from different users and have the same duration during each time frame in a common sequence. Forming of such a data sequence is rather appropriate in the absence of so-called priority users, e.g., emergency or rescue services, in the communication system, and with the proviso that the communication system has more or less uniform load. However, in practice, the load is rarely uniform and moreover, the operation becomes complicated in the presence of, e.g., priority users or assigned priority channels, when the forming a sequence of data transmitted from multiple users has a clearly defined asynchronous nature. In CDMA systems, information symbols of users are encoded by code words having the same number of bits. Even in those communication systems having a possibility to change a bit number in the code words for adapting to specific conditions in the communication channel, this changing of the bit number occurs simultaneously for all code words. In so doing, it is as difficult to provide an asynchronous transmitted data sequence, as in the case of TDMA systems.

A method for forming a signal system for multiple access communication is disclosed in U.S. Pat. No. 5,570,351 issued on Oct. 29, 1996 to Wornell. In this patent, information sequences for each user are coded by means of a convolution with the so called extended signature of that user, i.e., with a certain random sequence assigned to that user and unknown to any other user. Thus, this method pertains all the disadvantages of the CDMA, including the limited number of users.

Another method for forming a system for multiple access communication is disclosed by Dmitriev A. S. et al. in an article entitled "Dynamic chaos: A paradigm for modern communication systems" (Foreign radioelectronics. Advances in modern radioelectronics, 1997, No. 10, pp. 13–14). The method uses chaotic signals. According to this method, at least one dynamic chaotic system is constructed, such that the system has a strange attractor in its phase space, which is a plurality of chaotic trajectories and includes a set of a countable number of unstable periodic skeletal orbits. The unstable skeletal orbits are determined by the structure of oscillation of the dynamic chaotic system. Chaotic signals corresponding to a plurality of the unstable skeletal orbits are selected according to predetermined rules. Information messages consisting of the alphabet symbols of the users are received from users of the communication system. A common sequence formed from the symbols being received from users is formed so that a symbol follows an order defined in accordance with a predetermined rule. The dynamic chaotic system is successively tuned to generate the chaotic signals, each of which corresponds to the specific symbol of the formed common sequence. Then, in a communication channel, an asynchronous data sequence is formed from the chaotic signals generated successively. This method uses a spread-spectrum communication system. Advantages of spread-spectrum communication systems due to the use of chaotic signals are the ease of implementation and a possibility of constructing self-synchronizing circuits, stable with respect to various interferences. However, the article discloses only the principle for arranging a communication by chaotic signals, and does not disclose any concrete steps necessary for forming the chaotic signal system or asynchronous data sequences in a multiple access communication system.

In the existing multiple-access communication systems using the transmission with an asynchronous data sequence, an important feature is a possibility of such a system to extract, at the receiving side, those signals which are destined for a specific user.

The above mentioned article also discloses a method for extracting information from an asynchronous data sequence. An alphabet is assigned in advance to every sender-recipient pair in the communication system. Symbols of the alphabet differ from symbols of alphabets of at least some other sender-recipient pairs. At a transmitting side of the communication system, an asynchronous data sequence is formed from chaotic signals which are being sequentially generated by the dynamic chaotic system in accordance with an information message from each user. At a receiving part of the communication system, every recipient is provided with a selecting system tuned at extracting chaotic signals corresponding to symbols of alphabets assigned to this recipient in any sender-recipient pair in which this specific recipient takes part. Upon the reception of the asynchronous data sequence by a specific recipient, the recipient extracts the chaotic signals destined for this recipient from the asynchronous data sequence by the selecting system. However, this article describes only the principle for extracting information from an asynchronous data sequence in a multiple-access communication system formed on the basis of a chaotic signal system, and does not disclose any details concerning the specific steps that are necessary to extract the information from such an asynchronous data sequence.

SUMMARY OF THE INVENTION

In accordance with an aspect of the present invention, there is provided a multiple access communicating system including multiple users. The communication system comprises a chaotic signal generating unit, a chaotic signal receiving unit, and a communication link connecting the chaotic signal generating unit and the chaotic signal receiving unit.

The chaotic signal generating unit uses a transmitter dynamic chaotic system having a strange attractor including unstable periodic orbits. A set of characters is assigned to each sender-recipient pair of users, and each symbol of the characters is matched to one of the unstable orbits. The chaotic signal generated unit has a control device which carries out a step-by-step iterative process of the transmitter dynamic chaotic system to generate a required chaotic signal, stabilizes a current unstable orbit when a trajectory point on the current unstable orbit appeared in the iterative process falls into a predetermined vicinity of the required unstable orbit, and forms an asynchronous chaotic signal sequence from the stabilized unstable orbits.

The chaotic signal receiving unit includes a selecting system tuned at chaotic signals for the respective recipient. The selecting system uses a selecting dynamic chaotic system which has a strange attractor possessing a set of at least unstable orbits which correspond to the symbols of the characters assigned for the respective recipient. The chaotic signal receiving unit has a receiver control unit which performs a step-by-step iterative process of the selecting dynamic chaotic system to generate unstable orbits which correspond to chaotic signals destined for the respective recipient, and extracts the destined chaotic signals.

In accordance with another aspect of the invention, there is provided an apparatus and method for forming chaotic signals which uses at least one dynamic chaotic system having a strange attractor including unstable periodic orbits. An analysis of bifurcation characteristics of the dynamic chaotic system is provided, while constructing the dynamic chaotic system, to reveal parameter regions where the unstable orbits exist. A search of unstable orbits having predetermined periods is carried out in the revealed parameter regions to form a list of the unstable orbits found. A subset of the unstable orbits is selected such that differences between the unstable orbits satisfy predetermined criteria. Then, the dynamic chaotic system is controlled to form the chaotic signals corresponding to the selected unstable skeletal orbits.

The dynamic chaotic system may be successively tuned to generate the chaotic signals by starting a step-by-step iterative process of the dynamic chaotic system to generate a required chaotic signal, and stabilizing a current unstable orbit when a trajectory point on the current unstable orbit appeared in the iterative process falls into a predetermined vicinity of the required unstable orbit.

In accordance with another aspect of the present invention, there is provided an apparatus and method for extracting chaotic signals destined for a respective recipient from an asynchronous chaotic signals sequence. Each recipient is provided with a selecting system tuned at chaotic signals corresponding to symbols of characters assigned for the specific recipient. The selecting system uses a selecting dynamic chaotic system having a strange attractor possessing a set of at least unstable orbits which correspond to the symbols of the characters assigned for the respective recipient. The chaotic signals are extracted by performing a step-by-step iterative process of the selecting dynamic chaotic system to generate the unstable orbits corresponding to the chaotic signals destined for the specific recipient.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
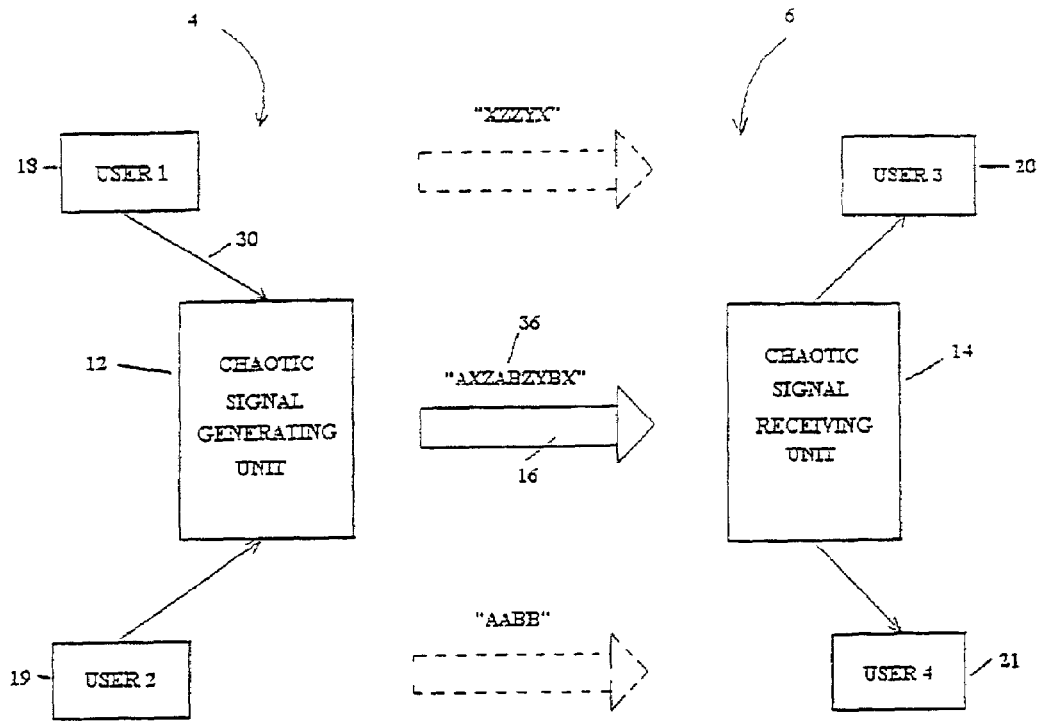
FIG. 1 is a block diagram of an embodiment of a multiple access communication system in accordance with the present invention.
Figure 2:
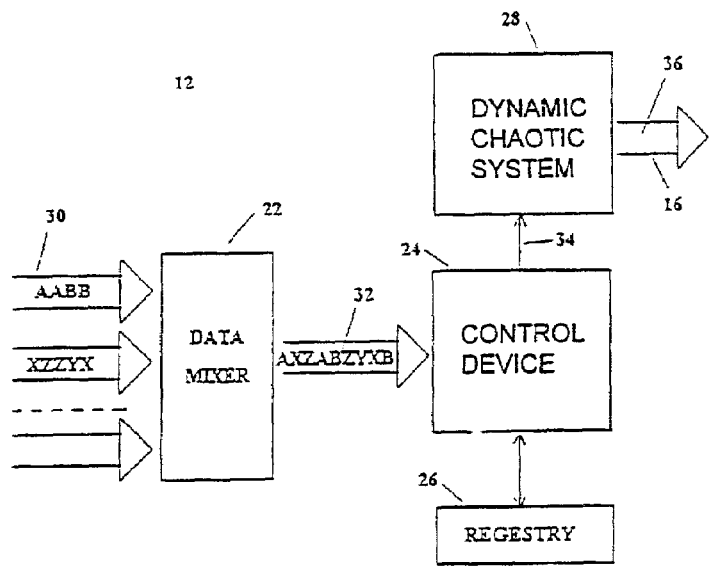
FIG. 2 is a block diagram of an embodiment of a chaotic signal generating unit shown in FIG. 1.

Referring to FIG. 1, an embodiment of a multiple access communication system 2 in accordance with the present invention is described. The communication system 2 comprises a chaotic signal generating unit 12 at a transmitting side 4, a chaotic signal receiving unit 14 at a receiving side 6, and a communication link 16 connecting the chaotic signal generating unit 12 and the chaotic signal receiving unit 14. The chaotic signal generating unit 12 receives data 30 from a plurality of users 18, 19 connected thereto, and generates a chaotic signal sequence 36 over the communication link 16. The chaotic signal receiving unit 14 receives the chaotic signal sequence 36 and extracts data 30 sent to users 20, 21 connected thereto, as described later. Only two users are shown in each transmitting side 4 and the receiving side 6 in FIG. 1 for simplicity of the drawing, but more than two users may be connected to each side of the communication system 2. FIG. 2 shows an embodiment of the chaotic signal generating unit 12. The chaotic signal generating unit 12 comprises a data mixer 22, a control device 24, a registry 26 and a dynamic chaotic system 28.

The data mixer 22 receives data 30 from multiple users, and mixes the data to generate an asynchronous mixed data sequence 32 to the control device 24. Using information stored in the registry 26 as described later, the control device 24 generates control signals 34 in accordance with the mixed data sequence 32. The dynamic chaotic system 28 generates chaotic signals in accordance with the received control signals 34 and forms an asynchronous chaotic signal sequence 36 over the communication link 16.

The dynamic chaotic system 28 generates dynamic chaos. The features of dynamic chaos on which the present invention is based are described. Dynamic chaos is also called deterministic chaos.

Dynamic chaos or deterministic chaos is a complex nonperiodic motion produced by a nonlinear dynamic system. This motion can occur in the absolute absence of external noise and is completely determined by the properties of the nonlinear dynamic system itself. Dynamic chaos possesses many features of random processes, e.g., continuous power spectrum, exponentially decreasing correlation function, unpredictability over large time intervals.

When describing the behaviour of the dynamic systems, a notion of a phase space is used. In the phase space, the state of a dynamic system is depicted by a point, and changes of this state in time domain are depicted by a phase trajectory, along which the depicting point moves. Systems with deterministic chaos have a region in the phase space, where the phase trajectories behave as if they gather in a single sequence. Such a region of the phase space is called a strange attractor or chaotic attractor.

An example of a chaotic behaviour is given by a logistic mapping expressed by following equation (1):

$$x(k+1) = \mu x(k)(1-x(k)) \qquad (1)$$

wherein $\mu$ is a variable system parameter and k is a variable.

In certain regions of parameter $\mu$, equation (1) produces a nonperiodic infinite sequence of samples $x_n$, which are directly related to the chaotic attractor in this dynamic system phase space. As was recently shown by Auerbach D., Cvitanovic P., Eckmann J. P., Gunarathe G. and Procaccia I. in an article entitled "Exploring chaotic motions through periodic orbits" (Phys. Rev. Lett. V.58, No. 23, P.2387, 1987); and by Cvitanovic P. in an article entitled "Invariant measurements of strange sets in terms of cycles" (Phys. Rev. Lett. V.61, No. 24, P.2729, 1988), the strange attractor can be treated as a certain "skeleton" of a countable number of unstable periodic orbits, i.e., limit cycles.

The chaotic motion of the depicting point depicting the state of the chaotic system can be treated as a "wandering" over this skeleton of the unstable orbits when the depicting point describes the trajectory hopping from one unstable orbit to another, thus visiting both the unstable orbits and their neighbourhoods.

The trajectories on the chaotic attractor have return properties. Each unstable orbit has a cycle period of time in which a current chaotic trajectory returns to a predetermined neighbourhood of a certain point called the return point. There may be several different unstable orbits of the same cycle period, which are called orbit forms. The number of different orbit forms of the unstable orbits increases exponentially with their repetition cycle period.

Figure 3:
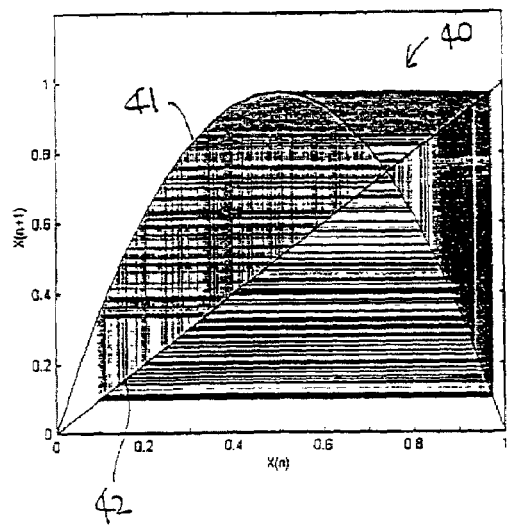
FIG. 3(a) is a diagram illustrating a logistic map.
FIG. 3(b) is a diagram illustrating an example of an unstable periodic orbit in the logistic map shown in FIG. 3(a)
FIG. 3(c) is a diagram illustrating another example of an unstable periodic orbit in the logistic map shown in FIG. 3(a)
Figure 3:
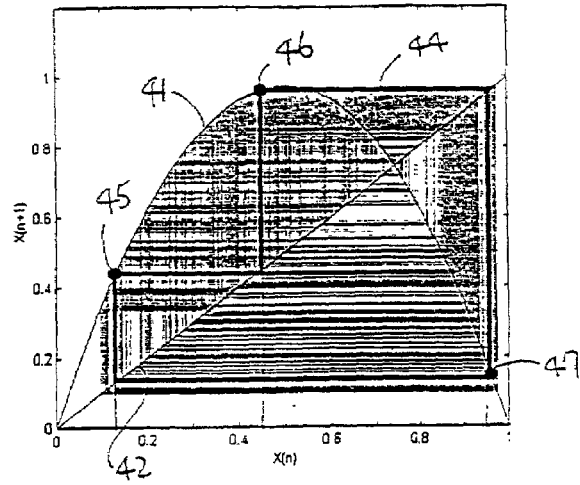
Figure 3:
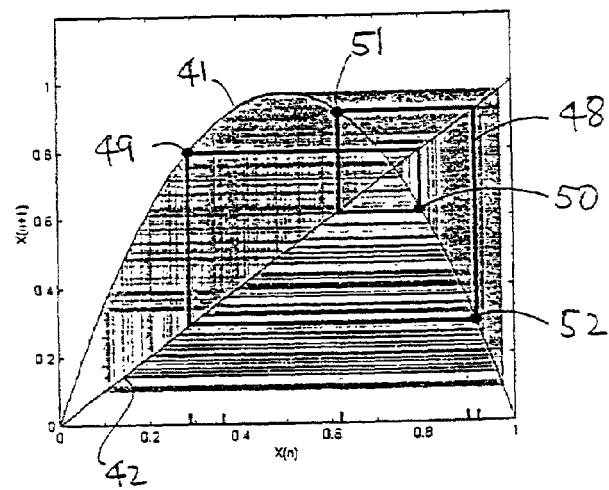

FIG. 3(a) is a diagram illustrating the chaotic dynamics of the logistic mapping (1) with the system parameter $\mu=3.9$. The depicting point on this diagram moves from some value $x_n$ along a vertical line to a parabolic curve 41 representing the term $-\mu x^2(k)$ of equation (1), then it goes along a horizontal line to a straight line 42 representing the term $\mu x(k)$ of equation (1) from the origin of coordinates, $x_{n+1}$, further again along a vertical line to the parabolic curve 41, then again to the straight line 42, $x_{n+2}$ and so on. Obtained in this sequential iteration, points $x_n$ form a chaotic sequence of samples. Unstable periodic orbits of all possible periods are embedded in the structure of a chaotic attractor 40. The sequence of appearance of the logistic mapping periodic orbits is subjected to the Sharkovsky order as described by Sharkovsky, A. N. in an article entitled "Coexistence of cycles of continuous transformations of the straight line into itself" (Ukrainian Math. Magazine, 1964, No 1, pp. 61–71 (in Russian)). The Sharkovsky order is described as follows:

$$1 \to 2 \to 2^2 \to 2^3 \to \ldots \to 2^n \to \ldots \to 5^n \to \ldots$$
$$\to 5^2 \to 5 \to \ldots \to 3^n \to \ldots \to 3^2 \to 3 \to \to \text{chaos}$$

FIG. 3(b) shows an example of a period-3 unstable orbit 44 which moves around points 45–47 on the parabolic curve 41. FIG. 3(c) shows an example of a period-4 unstable orbit 48 which moves around points 49–52 on the parabolic curve 41.

Figure 4:
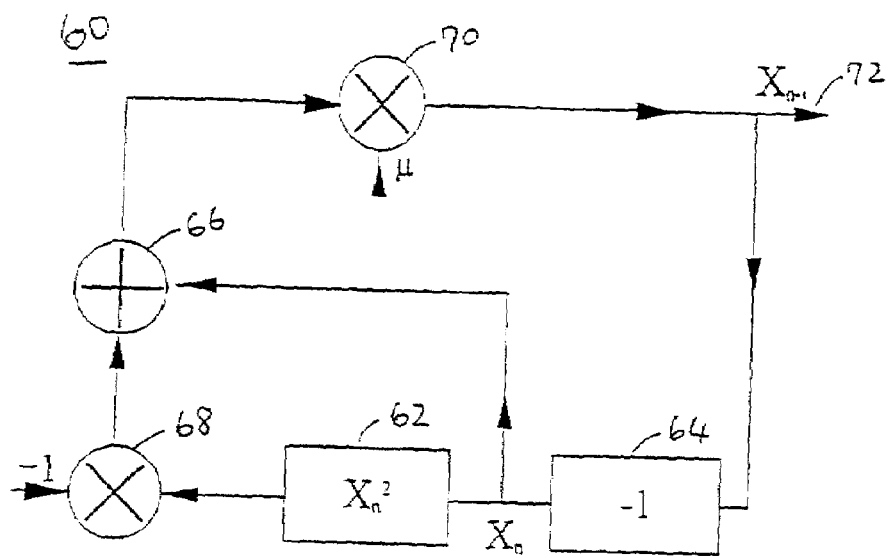
FIG. 4 is a circuitry diagram showing an example of a dynamic chaotic system for the logistic map shown in FIG. 3(a)

FIG. 4 shows an example 60 of the dynamic chaotic system 28 constructed in accordance with the logistic mapping (1). The dynamic chaotic system 60 comprises an inertia-less nonlinear converter 62 having quadratic characteristics and inscribed with "$X_n^2$", a one-tact delay element 64 inscribed with "−1", an adder 66 and multipliers 68 and 70. A value $X_n$ is input to the convertor 62 which outputs $X_n^2$. The multiplier 68 receives $X_n^2$ and multiplies it with −1 to output $-X_n^2$. The adder 66 adds $-X_n^2$ from the multiplier 68 and $X_n$, and outputs $X_n(1-X_n)$. The multiplier 70 receives $X_n(1-X_n)$ and multiplies it with p. Thus, $X_{n+1}=\mu X_n(1-X_n)$ is generated from an output 72. $X_{n+1}$ is also input to the delay element 64 to repeat the above processes.

All the elements 62–70 of the chaotic system 60 may be realized by well-known techniques with the help of both hardware and software.

The present invention uses unstable orbits whose structure is unique for every dynamic system. In the same dynamic system, the structure of the unstable orbits is different at different sets of the system parameters. Thus, for each dynamic system at a fixed values of its parameters, there is a unique set of unstable orbits, whose total number is countable. This very fact allows utilization of the set of unstable orbits or its part of a chaotic attractor as a signal system for multiple access communications in the present invention.

Referring back to FIGS. 1 and 2, the chaotic signal generating unit 12 carries out information encoding procedure by forming a sequence 36 of chaotic signals corresponding to different unstable orbits of the chaotic attractor of the dynamic chaotic system 28. That is, the chaotic signal generating unit 12 sequentially reproduces the unstable orbits which correspond to symbols of data transmitted by users 18, 19. The reproduction of the unstable orbits may be repeated several times. In the absence of data to transmit, the phase trajectory wanders over the set of unstable orbits that make up the structure of the chaotic attractor, and that are not corresponding to any symbols of any data from users 18, 19.

Figure 5:
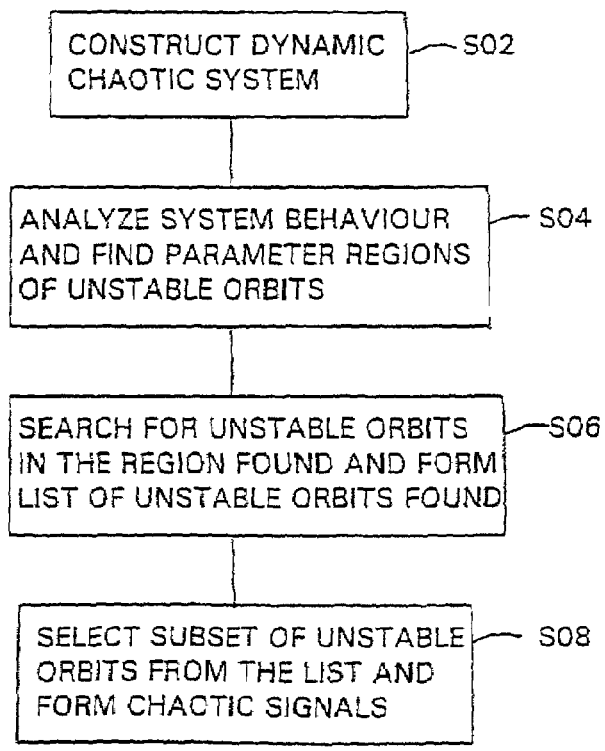
FIG. 5 is a flowchart showing an embodiment of a method for generating chaotic signals in accordance with the present invention.

FIG. 5 shows the steps of an embodiment of the method for forming chaotic signals in accordance with the present invention.

The method starts with constructing at least a dynamic chaotic system 28 (S02). The dynamic chaotic system 28 has one or more variable parameters, and is capable of chaotic behaviour at some parameter values. Such parameter values are in general unknown beforehand. The chaotic system 28 has a chaotic attractor in its phase space, which is a plurality of chaotic trajectories and includes a set of a countable number of periodic unstable orbits.

The behaviour of the dynamic chaotic system 28 in the whole range of its parameter variation is analysed by the control device 24 to find parameter regions where unstable orbits exist (SO4). The control device 24 conducts a search for unstable orbits in the found parameter regions where the unstable orbits exist, and forms a list of the unstable orbits found in she registry 26 (SO6). A subset of the unstable orbits is selected from the list to form chaotic signals (S08). The chaotic signals are utilized to encode data received from users for transmission, as described later.

For analysing the dynamic chaotic system behaviour in step S04, the control device 24 plots a bifurcation diagram in each parameter plane of the dynamic chaotic system 28. The bifurcation diagram is a diagram indicating birth and destruction of unstable periodic orbits as parameters are varied. In the bifurcation diagram, boundaries of parameter regions corresponding to similar behaviour are determined, i.e., regions corresponding to stable equilibrium states, regions of periodic motion of various periods, regions of chaotic modes, and regions with no finite solutions. Thus, those parameter regions where unstable skeletal orbits exist can be determined.

In order to plot the bifurcation diagram, the control device 24 may directly iterates the equations of the dynamic chaotic system 28 on the mesh of parameter values defining the behaviour of the dynamic chaotic system 28, and analyse the obtained time series. The control device 24 may also plot the bifurcation diagram by numerically integrating the system equations on the mesh of parameter values defying the behaviour of the dynamic chaotic system 28, and then analysing the obtained solution.

Figure 6:
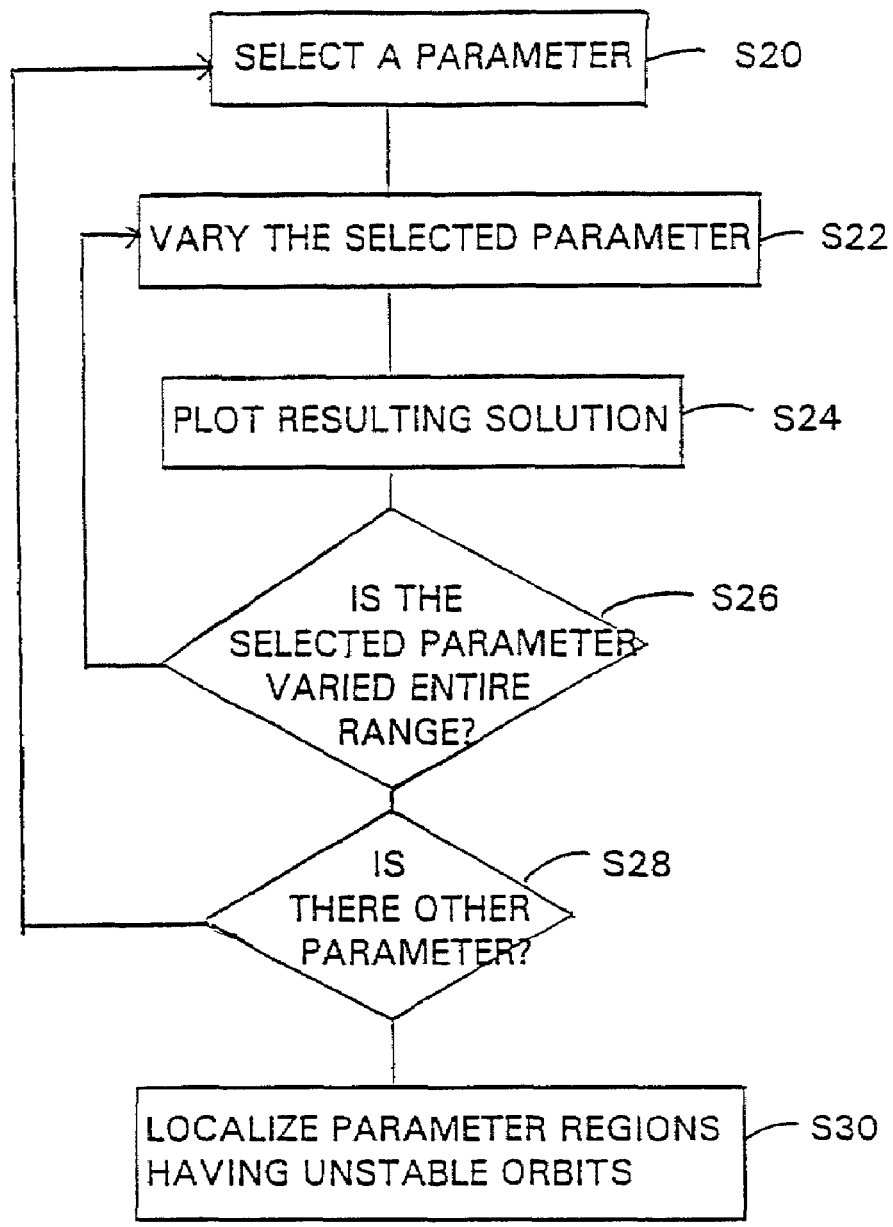
FIG. 6 is a flowchart showing an embodiment of a method for finding regions of unstable orbits in a phase space of the dynamic chaotic system.

An example of the procedure for plotting the bifurcation diagram is shown in FIG. 6. The procedure starts by selecting a single system parameter (S20) to analyse the dynamic system behaviour as a function of the selected parameter with all other parameter values fixed. The selected parameter is incremented or decremented with a small step (S22), and for each value of the selected parameter, the resulting solution is analysed and plotted (S24). For example, the stable equilibrium state or a periodic solution are determined directly from the form of the solution obtained as a result of numerical integration of the system, while quasi-periodic or chaotic modes are identified from the analysis of the spectrum of Lyapunov exponents.

The steps of S22 and S24 are repeated until the selected parameter is varied its entire range (S26). As a result, a line is plotted in a plane or hyperplane of the parameter space, corresponding to the variation of the selected parameter.

The steps of S20–26 are repeated for a different parameter until all parameters are selected (S28). Thus, on a dense mesh of the parameter space, the boundaries of the regions corresponding to the dynamic system similar modes are plotted. Then, regions in the parameter space having unstable periodic orbits are identified and localized (S30). It is preferable to localize regions with the large diversity of the unstable orbits to provide better chaotic signals. The analysis of the bifurcation diagram allows a preliminary estimate of the complexity of the unstable periodic orbit structure of chaotic attractors.

As the trajectories on the chaotic attractor have return properties, for any point of the chaotic attractor on which the trajectory is at present, there exists a time interval T in which the trajectory comes in any small vicinity or neighbourhood of this point.

After the localization of the regions with preferably potentially large diversity of unstable periodic orbits in the parameter space, the search procedure of step S06 in FIG. 5 is carried out. An unstable orbit found in the search is registered in registry 26 (FIG. 2). The search is continued to find unstable orbits with repetition periods up to a maximum cycle period $T_{max}$. Thus, at the end of the search, a list of those unstable orbits is formed in the registry 26.

The search for other unstable chaotic orbits with the period T is performed on the same chaotic trajectory or on a different chaotic trajectory.

Figure 7:
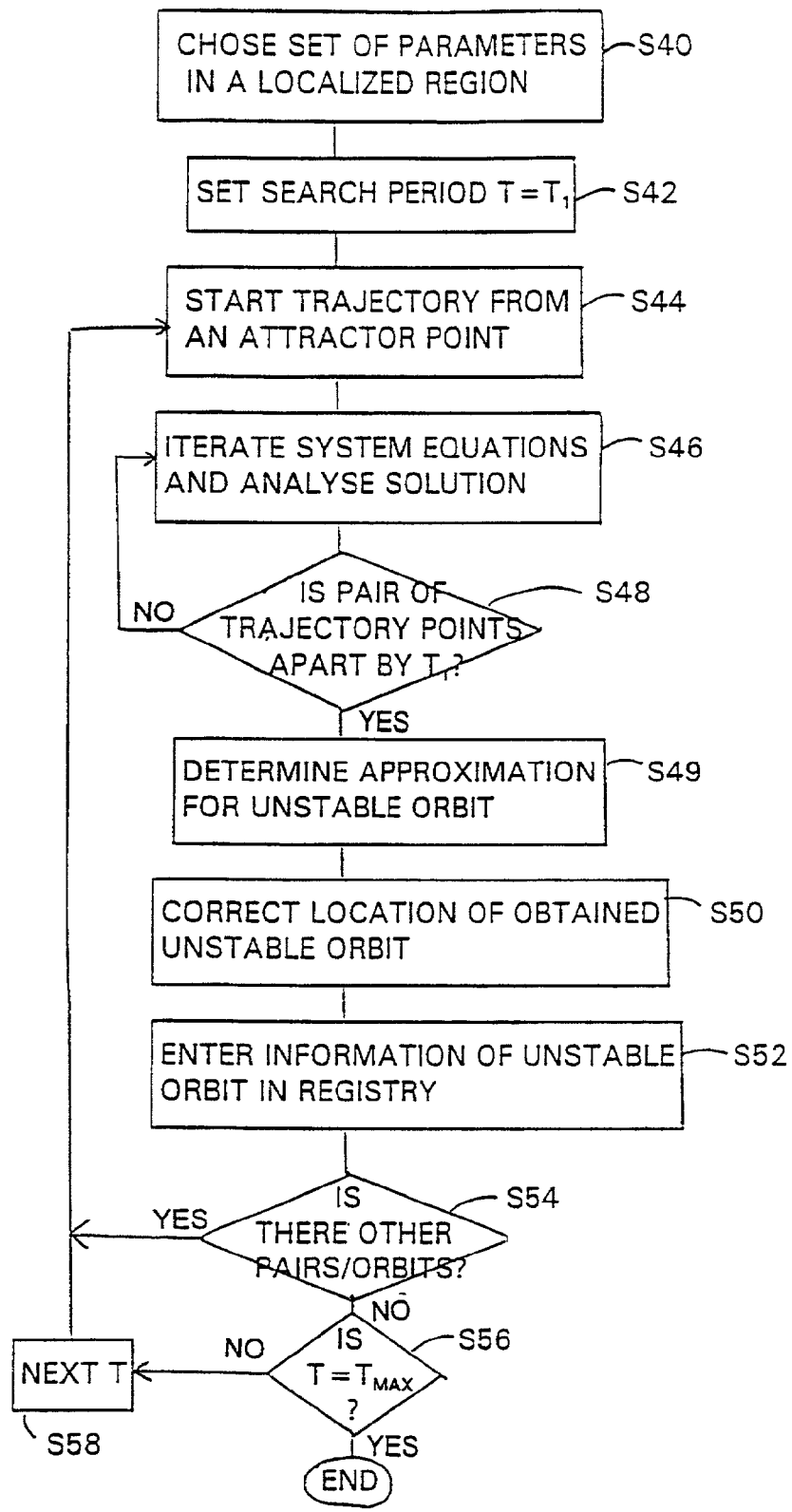
FIG. 7 is a flowchart showing an embodiment of a method for searching unstable orbits in the phase space of the dynamic chaotic system.

An example of the search procedure is shown in FIG. 7. The search starts by choosing a set of system parameters belonging to one of the localized regions (S40). The initial conditions of the chaotic attractor of the dynamic chaotic system is set with this set of parameters.

A search is started by setting a searching period $T=T_1$ (S42). In order to find an unstable orbit of cycle period $T_1$, the trajectory starts from an arbitrary attractor point (S44). The dynamic chaotic system equations are iterated by integrating the equations numerically (S46). The solution is continuously checked by a search for pairs of trajectory points standing apart by the time interval T, in time domain, such that the distance between them is less than a predetermined value in the phase space (S48). The steps of S46 and S48 are repeated until such a pair of trajectory points is found.

When such a pair of trajectory points is found, the piece of the trajectory between the pair of trajectory points is taken as an approximation for a period-$T_1$ unstable orbit (S49).

Then, the location of the obtained unstable orbit in the phase space is corrected (S50) and the form of the newly found unstable orbit is determined. If its form differs from the form of the orbits present in the registry, the information of the form of the orbit is also entered to the list of the registry (S52).

The correction of the location of the unstable orbit may be carried out using a Newton iteration procedure for finding roots of the nonlinear equations. The obtained initial unstable orbit estimate is used for setting the initial conditions for the further iteration procedure.

The search procedure is sequentially applied (S54) to search for other unstable chaotic orbits with the period T, on the same chaotic trajectory or on a different chaotic trajectory. The search is further continued (S58) to search for unstable orbits with the periods $T_2<T_3< \ldots <T_{max}$ until the maximum period $T_{max}$ (S56).

For example, a dynamic chaotic system may be given by a mapping of N-dimensional space into itself by the following equation:

$$x_{k+1}=F(x_k)$$

where $x_k$, $x_{k+1} \in R^N$, and x is a point on a period-m unstable orbit, i.e., $x=F_m(x)$. Consequently, x is a root to a system having the following nonlinear equation:

$$G_m(x)=F_m(x)-x=0$$

The root x can be found with the help of the Newton iteration procedure:

$$x_{k+1}=x_k-G'_m{}^{-1}(x_k)G(x_k)$$

where $G'_m(x_k)$ is the Jacobean for $G_m(x_k)$. After x is found, all other m−1 points of the unstable orbit are calculated along with the cycle eigenvalue. Information on the found unstable orbit, e.g., its form and eigenvalue, is included into the list in the registry.

As a result, a list of the skeletal unstable orbits of various periods and their characteristics, e.g., eigenvalues, is formed, corresponding to the chosen set of the dynamic system parameters.

The procedure of forming the list of skeletal unstable orbits is now further described with examples of two classical two-dimensional maps with chaotic behaviour: a Henon map and a Lozi map.

The Henon map is represented by the following equations:

$$x(k+1)=1-\alpha x(k)^2+y(k), y(k+1)=\beta x(k) \quad (2)$$

where $\alpha$ and $\beta$ are variable system parameters and k is a variable. The Henon map exhibits a variety of dynamical phenomena inherent to map's dynamics. Its dynamics is conditionally determined by three successive operations: nonlinear stretching, invariant rotation and contraction. The structure of a dynamic chaotic system 80 for generating the Henon map is presented in FIG. 8.

The Henon map dynamic chaotic system 80 comprises a nonlinear converter 82, one-tact delay elements 90, 96, adders 86, 92 and multipliers 84, 88. A value $X_n$ is input to the convertor 82 which outputs $X_n{}^2$. The multiplier 84 receives $X_n{}^2$ and multiplies it with $-\alpha$. The output $-\alpha X_n{}^2$ of the multiplier 84 is input to the adder 86 which adds 1 to $-\alpha X_n{}^2$, and outputs $1-X_n{}^2$. The value $X_n$ is also input to the multiplier 88 which multiplies it with $\beta$. The output $\beta X_n$ of the multiplier 88 is input to the delay element 90 which outputs $\beta X_{n-1}$. The adder 92 adds the output $1-\alpha X_n{}^2$ of the adder 86 and the output $\beta X_{n-1}$ of the delay element 90, and outputs $1-\alpha X_n{}^2+\beta X_{n-1}$. Thus, $X_{n+1}=1-\alpha X_n{}^2+\beta X_{n-1}$ is generated from an output 94. The value $X_{n+1}$ is also input to the delay element 96 and the above processes are repeated.

The Henon map chaotic system 80 is provided as a dynamic chaotic system 28 in FIG. 2, and connected to the control device 24.

Figure 9:
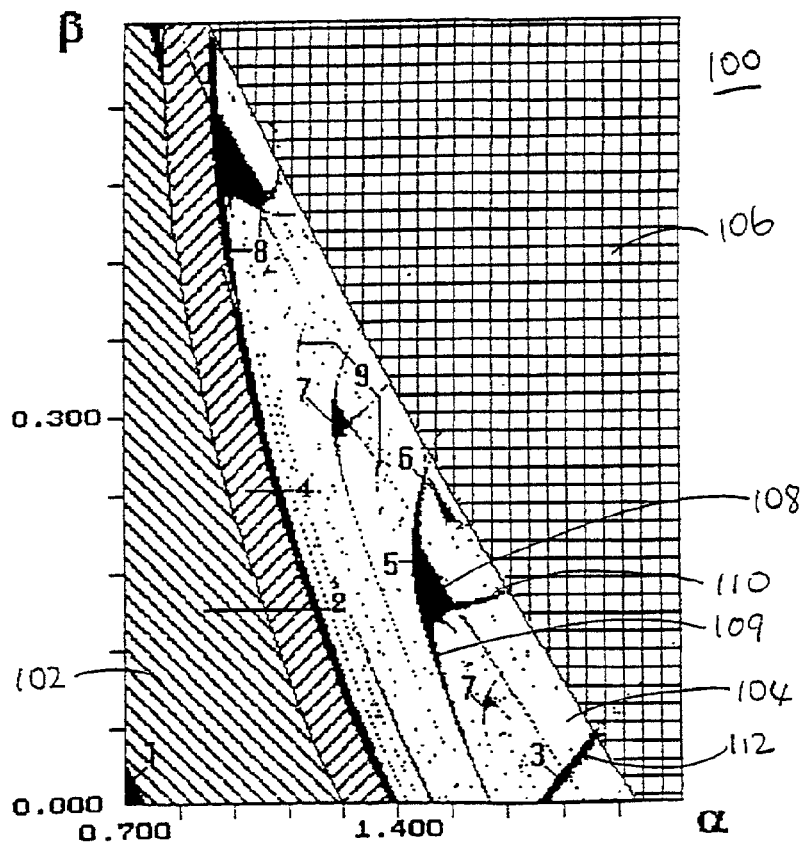
FIG. 9 is a diagram showing bifurcation for system parameters $\alpha$, $\beta$ for the Henon map.

The control device 24 plots a two-parameter bifurcation diagram 100 of parameters α and β, as shown in FIG. 9 by plotting one-parameter cross-sections α=constant with the parameter β increment step equal to 0,005.

The bifurcation diagram 100 characterizes the behaviour of the Henon map at various system parameter values. The digits in the diagram 100 denote the parameter regions of the "stability windows" 102, in which stable limit orbits of the corresponding periods exist. White regions 104 correspond to the chaotic behaviour. Unstable mode region 106 is located in the top right corner region 106 of the diagram 100.

First, the system behaviour with increasing α and fixed β is accompanied by successive birth of orbit pairs of stable and unstable ones of the periods 2, 4, . . . $2^n$. Then a wide region 104 of chaotic behaviour appears as a white zone in the diagram. Within the chaotic region 104, numerous "swallow"-like windows 108 of stability exist. The boundaries of the 'tails' 110 are the lines of the birth of new periodic orbits. When stable orbits cross the corresponding boundaries, they lose their stability, but still remain in this chaotic attractor structure as unstable orbits.

Detailed analysis of the chaotic mode structure indicates that it is very rich filled by the stability windows, which may be classified into two types: swallow-like windows and strip-like windows.

In FIG. 9, swallow-like windows of the periods 5, 7 and 9 are depicted. The orbits with the same period but with different forms can appear in the structure. Each swallow-like window 108 consists of two "wings" 109 at front and overlapping "tail" 110 at back. With an increase in the parameter α, the front "wings" 109 open through a tangential bifurcation of the birth of a pair of stable and unstable orbits of the same cycle period, very close by form. As the parameter α increases further, the stable orbit loses its stability through a period-doubling bifurcation, but both period-m orbits remain in the structure of the attractor in unstable form for all subsequent values of parameter α beyond the tangential bifurcation line. So the tangential bifurcation line divides the parameter plane into two regions where both skeleton unstable orbits either exist simultaneously, or not exist at all.

Further increase in parameter α results the "swallow tail" 110 opens and closes in the same succession, producing another pair of period-m orbits in the parameter region bounded by the front tail boundary.

Figure 10:
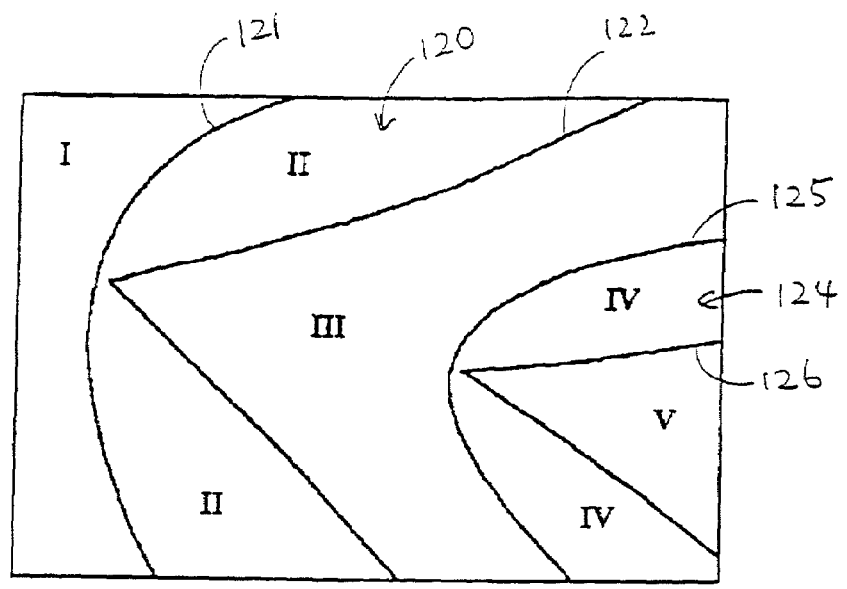
FIG. 10 is a diagram schematically showing birth and accumulation of skeletal unstable orbits for swallow-like windows of stability appearing in FIG. 9.

FIG. 10 illustrates the birth and accumulation of period-m orbits for two successive swallow-like stability windows 120, 124 of period-m orbits. Bifurcation lines, corresponding to the swallow wings 121, 125 and tails 122, 126, subdivide the parameter space into five regions I–V. There is no period-m orbits in region I. When parameter α crosses the boundary between regions I and II, corresponding to the swallow wing 121 of the first window 120, one pair of period-m orbits is born. In region III, there exist two pairs of period-m orbits produced by the first window 120 of stability. On the boundary between III and IV regions, corresponding to the swallow wing 125 of the second window 124, another pair of period-m orbits is born. Finally, in region V, all four pairs of period-m skeleton orbits exist in the attractor structure, born by two depicted windows 120, 124.

Another interesting phenomena of the swallow-like window is the coexistence of two stable orbits in the "tail" overlapping of swallow-like window. Realization of a concrete mode in the system is determined by the initial conditions of the system trajectory.

Figure 11:
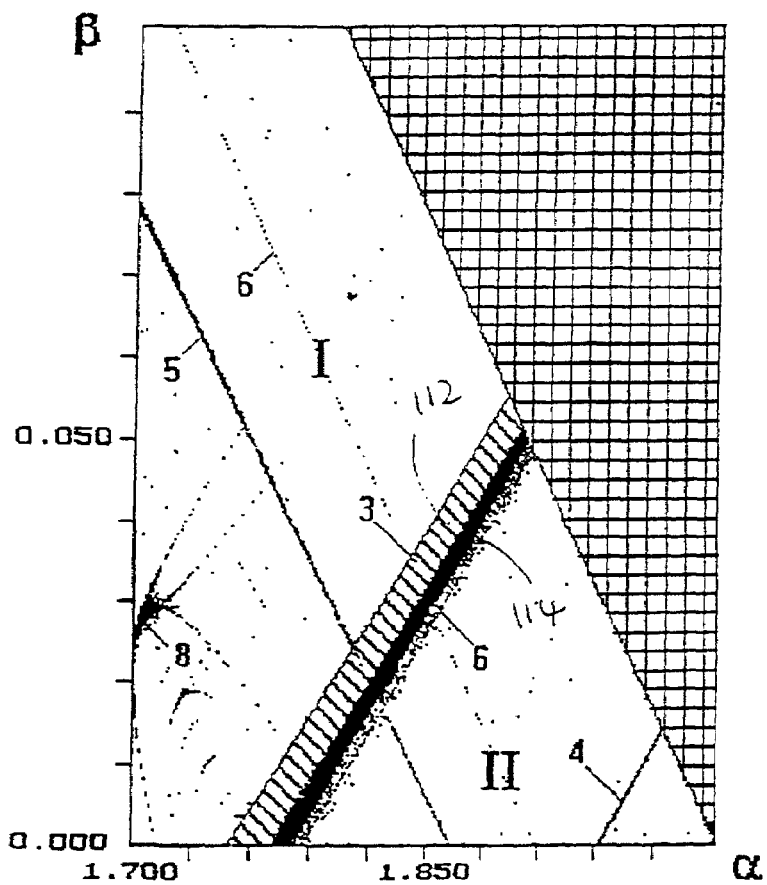
FIG. 11 is a diagram showing an enlarged fragment of the bifurcation diagram shown in FIG. 9.

The structure of the "strip-like" window 112 is more simple. A fragment of the bifurcation diagram 100, including the period-3 orbit stability window 112, is presented in FIG. 11. This window 112 is an oblique strip in the parameter plane and the slope of the strip is the same for all strip-like windows of all the periods in the diagram 100. As parameter α increases, first, as in the swallow-like windows case, a pair of period-3 orbits of stable and unstable appears as a result of tangential bifurcation. Then, with increasing parameter α, the stable orbit loses stability through a period-doubling bifurcation 114, though both period-3 orbits of this pair remain in the attractor structure in the unstable form.

Thus, there are three different possibilities of the orbit birth in the bifurcation diagram 100:

(a) A skeleton period-m unstable orbit appears from a period-m/2 orbit as a result of the period-doubling bifurcation for even m.

(b) A pair of period-m orbits appears as a result of tangential bifurcation on the boundaries of the swallow wings or tail stability windows of a period-m orbit.

(c) A pair of period-m orbits including stable and unstable orbits appears as a result of tangential bifurcation on the front boundary of strip-like stability windows of a period-m orbit.

Detailed analysis of Henon attractor allows to compile a list of the skeleton unstable orbits. A list for parameters α=1.4, β=0.3 is shown in Table 1.

TABLE 1

| | (α = 1.4, β = 0.3) | | | | | | | | | | |
|---|---|---|---|---|---|---|---|---|---|---|---|
| Cycle period n | 1 | 2 | 3 | 4 | 5 | 6 | 7 | 8 | 9 | 10 | 13 | 17 |
| Number of forms | 1 | 1 | 0 | 1 | 0 | 2 | 4 | 7 | 6 | 10 | 32 | 164 |

The location of the windows in the parameter plane allows to draw a conclusion about accumulation of the total number of orbits in the Henon map with increasing nonlinearity parameter α and decreasing parameter β. The point of accumulation of all possible orbits (α, β)=(2,0) corresponds to the degeneration of the Henon map into the above 1-D logistic map (1). A numerical analysis performed at these parameter values has shown much more rich registry unstable periodic orbits of the attractor, as shown in Table 2, as compared to the classical case of (α, β)=1.4, 0.3) shown in Table 1.

TABLE 2

| | (α = 2.0, β = 0.0) | | | | | | | | | |
|---|---|---|---|---|---|---|---|---|---|---|
| Cycle period n | 1 | 2 | 3 | 4 | 5 | 6 | 7 | 8 | 9 | 10 | 13 |
| Number of forms | 1 | 1 | 2 | 3 | 6 | 10 | 12 | 39 | 64 | 116 | 752 |

Figure 12:
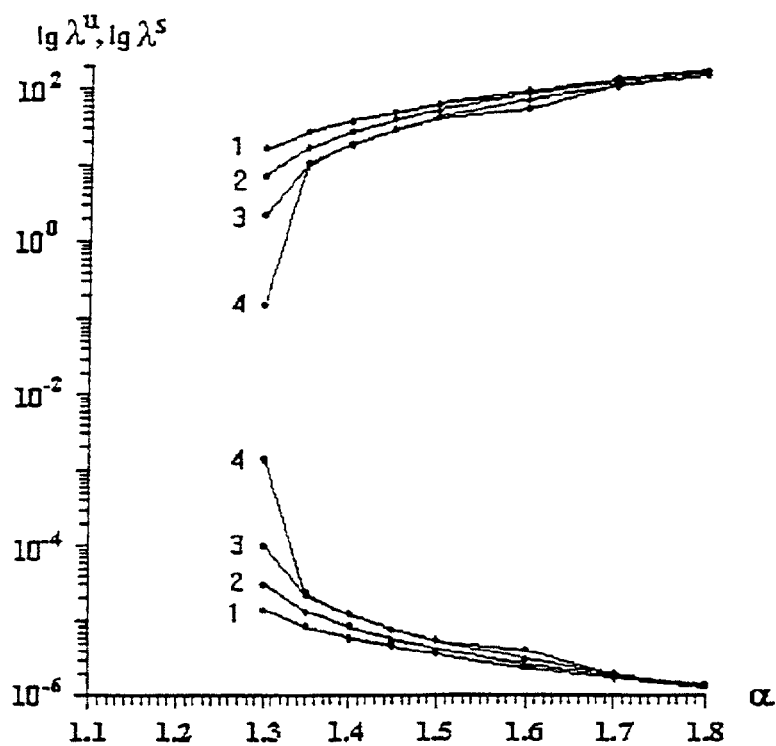
FIG. 12 is a diagram illustrating cycle eigenvalues for four period-7 skeletal orbits appearing in FIG. 9.
Figure 13:
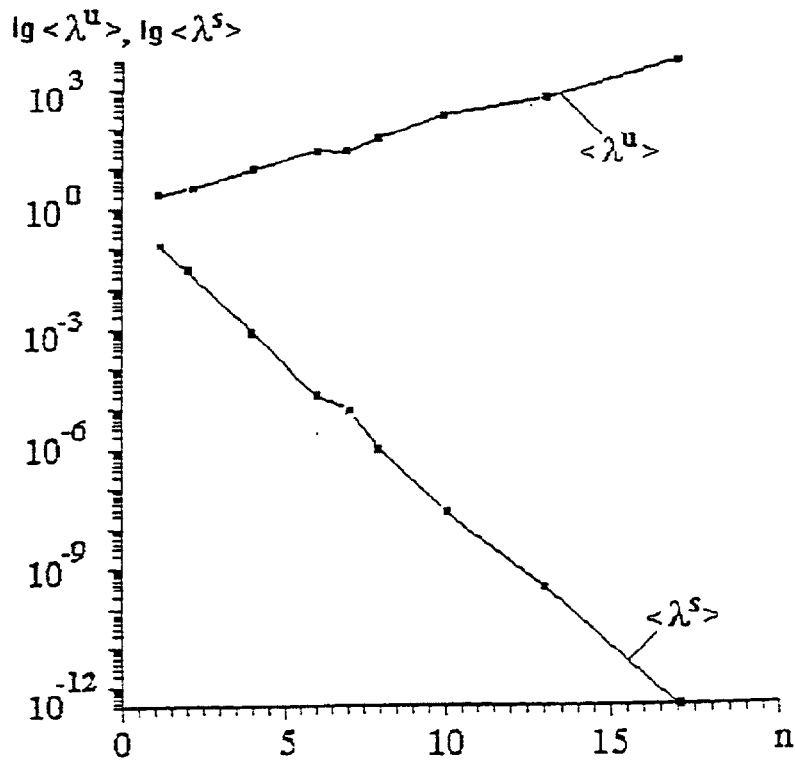
FIG. 13 is a diagram illustrating cycle period dependency of average eigenvalues shown in FIG. 12.

If one will treat the orbits as intermediate system states and the degree of their instability as a value characterizing the time of the system's presence in these states, then one can say that as nonlinearity, i.e., parameter α, increases, the number of the possible states also increases, as well as the rate of transitions between these states. A characteristic feature of the attractor cyclic structure is the exponential growth of the average cycle eigenvalues with an increase of their cycle periods. Evolution of the average stable and unstable eigenvalues $\lambda^s_1$ and $\lambda^u_1$, corresponding to the stable and unstable manifolds, with increasing α and fixed β=0.3 is presented in FIG. 12 on examples of four different period-7 orbits. Average stable and unstable cycle eigenvalues $\lambda^s_i$ and $\lambda^u_i$ as functions of the cycle period n are shown in FIG. 13 for the chaotic attractor in the point (α, β)=(1.4, 0.3).

The Lozi map is another example of canonical chaotic systems and represented by the following equations:

$$x(k+1)=(\alpha-1)-\alpha|x(k)|+y(k), \quad y(k+1)=\beta x(k) \qquad (3)$$

where α and β are variable system parameters and k is a variable. The structure of a dynamic chaotic generating system 140 based on Lozi map is presented in FIG. 14.

The Lozi map dynamic chaotic system 140 comprises a nonlinear converter 142 for converting an input value to its absolute value, one-tact delay elements 150, 156, adders 146, 152 and multipliers 144, 148. A value $Y_n$ is input in the convertor 142 which outputs $|Y_n|$. The multiplier 144 receives $|Y_n|$ and multiplies it with $-\alpha$. The output $-\alpha|Y_n|$ of the multiplier 144 is input to the adder 146 which adds $(\alpha-1)$ to $-\alpha|Y_n|\oplus$, and outputs $(\alpha-1)-\alpha|Y_n|$. The value $Y_n$ is also input to the multiplier 148 which multiplies it with β. The output $\beta Y_n$ of the multiplier 148 is input to the delay element 150 which outputs $\beta Y_{n-1}$. The adder 152 adds the output $(\alpha-1)-\alpha|Y_n|$ of the adder 146 and the output $\beta Y_{n-1}$ of the delay element 150, and outputs $(\alpha-1)-\alpha|Y_n|+\beta Y_{n-1}$. Thus, $Y_{n+1}=(\alpha-1)-\alpha|Y_n|+\beta Y_{n-1}$ is generated from an output 154. $Y_{n+1}$ is also input to the delay element 156 and the above processes are repeated.

The Lozi map chaotic system 140 is provided as a dynamic chaotic system 28 in FIG. 2, and connected to the control device 24.

Figure 15:
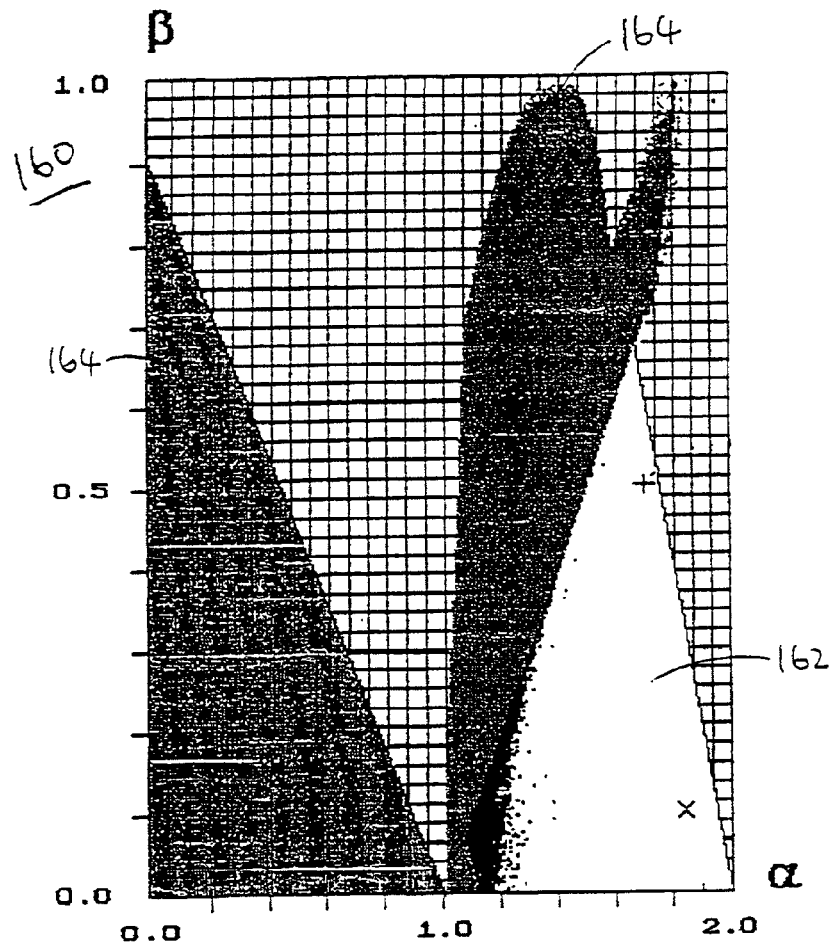
FIG. 15 is a diagram showing chaotic attractor structure for the Lozi map with parameters $\alpha=1.7$, $\beta=0.5$.

The control device 24 plots a two-parameter bifurcation diagram 170 of parameters α and β, as shown in FIG. 15 in a similar manner to the Henon map (2), using one-parameter cross-sections α=constant with small parameter β increments.

In the diagram 160, a white area indicates a chaotic attractor existence region 162, and the dark areas indicate unstable orbits 164.

In contrast to the Henon map (2), there are no stability windows in the chaotic attractor existence region 162. At the same time, the structure of unstable orbits 164 of Lozi attractor is richer than that of the Henon map. Tables 3 and 4 which show lists of unstable orbits of the Lozi attractor skeleton unstable orbits obtained for two sets of system parameters (α, β)=(1.7, 0.5) and (α, β)=(1.8, 0.08), respectively.

TABLE 3

| | (α = 1.7, β = 0.5) | | | | | | | | |
|---|---|---|---|---|---|---|---|---|---|
| Cycle period T | 1 | 2 | 3 | 4 | 5 | 6 | 7 | 8 | 9 |
| Number of forms N | 1 | 1 | 0 | 1 | 0 | 4 | 4 | 8 | 10 |
| Eigenvalue $<\lambda_a>$ | 1.9 | 1.7 | — | 7.8 | — | 20 | 45 | 70 | 150 |
| Cycle period T | 10 | 11 | 12 | 13 | 14 | 15 | 16 | 17 | |
| Number of forms N | 12 | 18 | 34 | 54 | 78 | 116 | 162 | 224 | |
| Eigenvalue $<\lambda_a>$ | 200 | 400 | 600 | $10^3$ | $2 \times 10^3$ | $3 \times 10^3$ | $7 \times 10^3$ | $10^4$ | |

TABLE 4

| | (α = 1.1, β = 0.85) | | | | | | | | |
|---|---|---|---|---|---|---|---|---|---|
| Cycle period T | 1 | 2 | 3 | 4 | 5 | 6 | 7 | 8 | 9 |
| Number of forms N | 1 | 1 | 2 | 1 | 4 | 6 | 8 | 18 | 26 |
| Eigenvalue $<\lambda_a>$ | 1.9 | 3.2 | 6 | 12 | 20 | 40 | 60 | 100 | 250 |
| Cycle period T | 10 | 11 | 12 | 13 | 14 | 15 | 16 | 17 | |
| Number of forms N | 38 | 80 | 120 | 208 | 368 | 614 | $>10^3$ | $>10^3$ | |
| Eigenvalue $<\lambda_a>$ | 500 | 800 | $10^3$ | $2 \times 10^3$ | $3 \times 10^3$ | $8 \times 10^3$ | $>10^4$ | $>10^4$ | |

Figure 16:
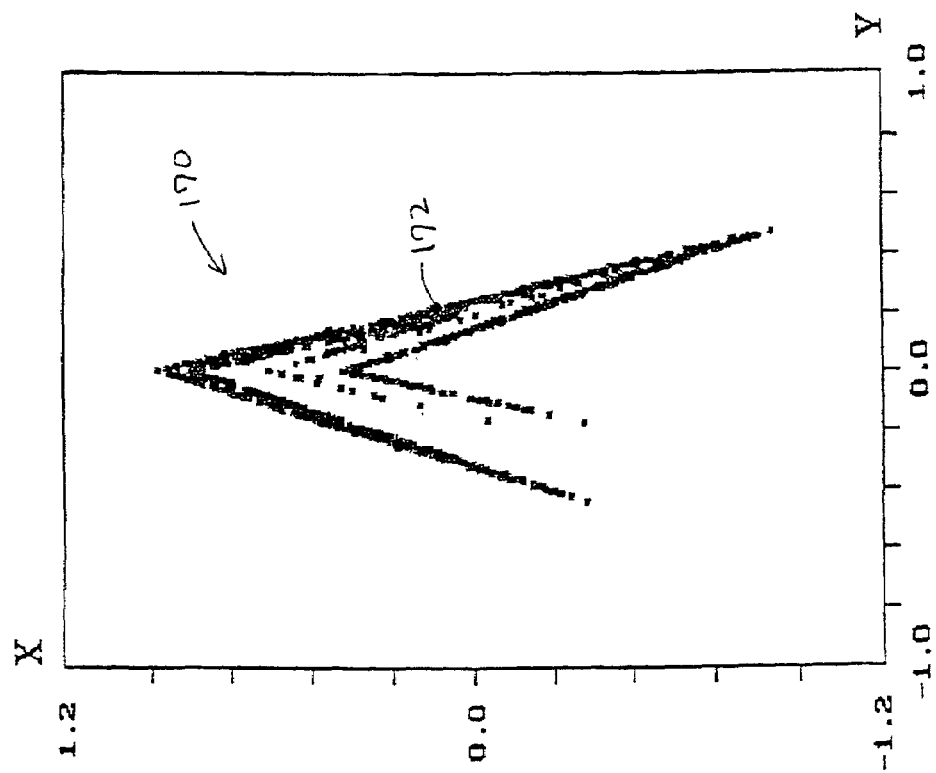
FIG. 16 is a diagram showing bifurcation for system parameters $\alpha$, $\beta$ for the Henon map.
Figure 17:
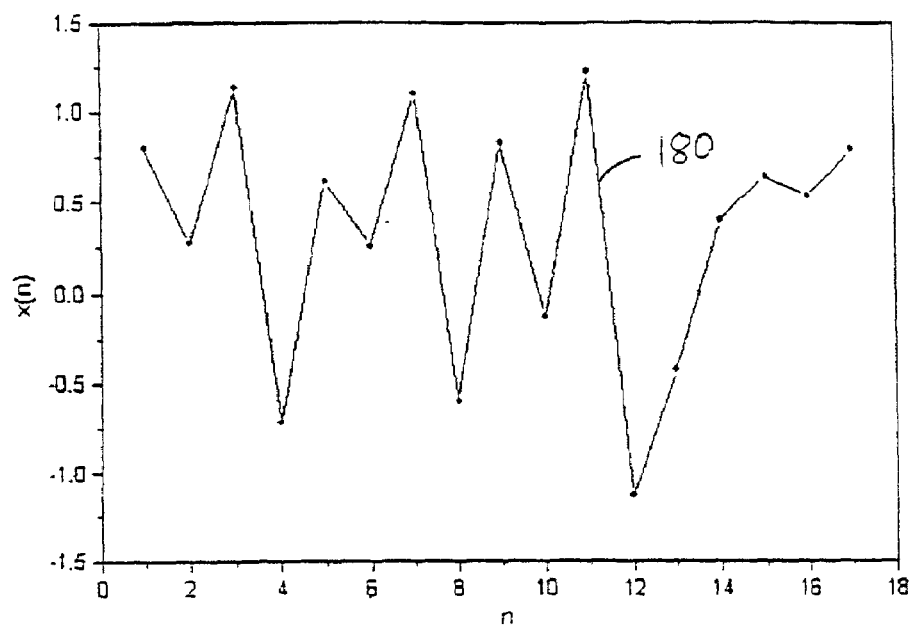
FIG. 17(a) is a diagram showing an example of a period-16 unstable skeletal orbit belonging to the chaotic attractor shown in FIG. 15.
FIG. 17(b) is a diagram showing another example of a period-16 unstable skeletal orbit belonging to the chaotic attractor shown in FIG. 15.
FIG. 17(c) is a diagram showing another example of a period-16 unstable skeletal orbit belonging to the chaotic attractor shown in FIG. 15.
FIG. 17(d) is a diagram showing another example of a period 16 unstable skeletal orbit belonging to the chaotic attractor shown in FIG. 15.
Figure 17:
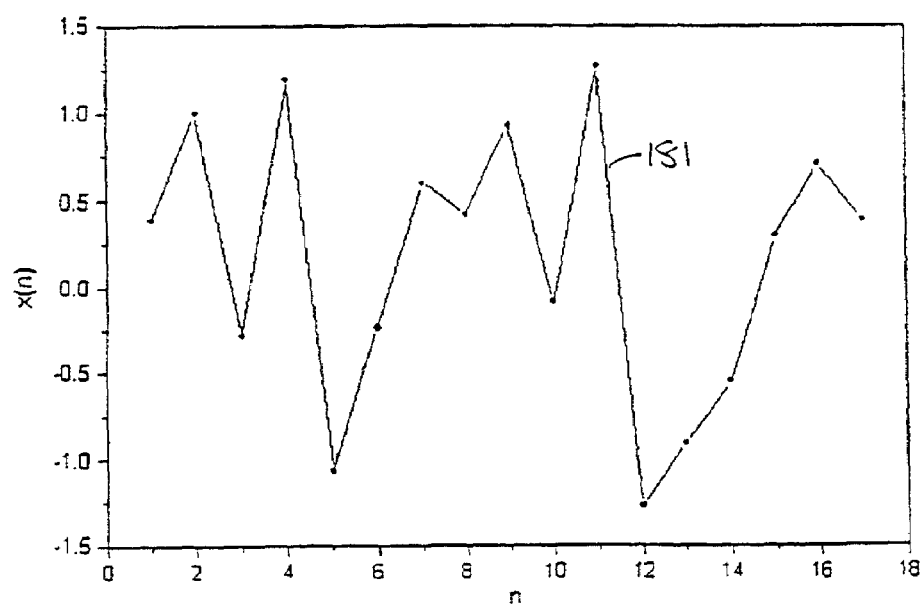
Figure 17:
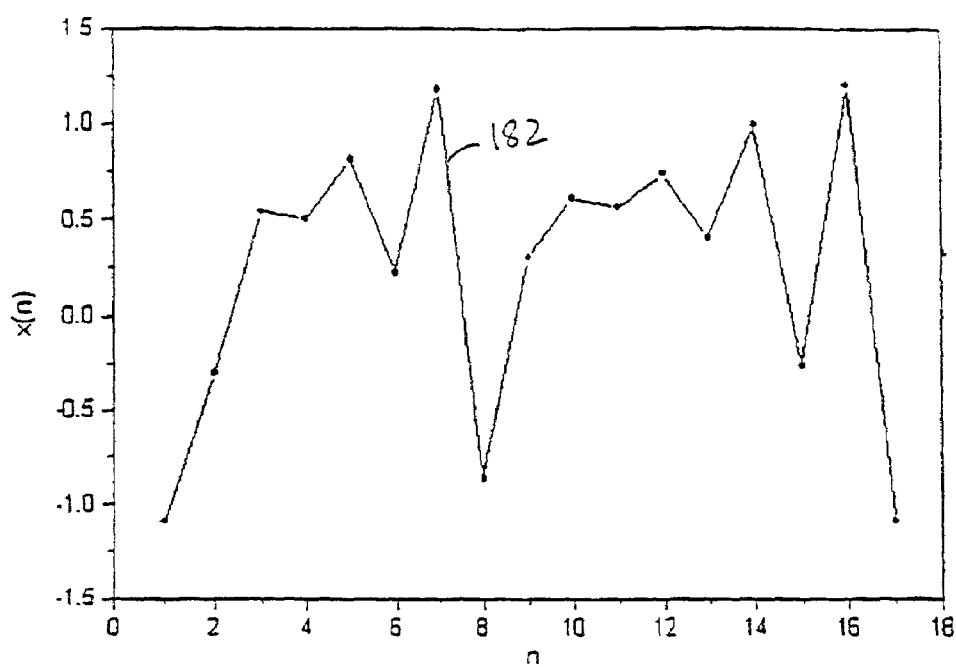
Figure 17:
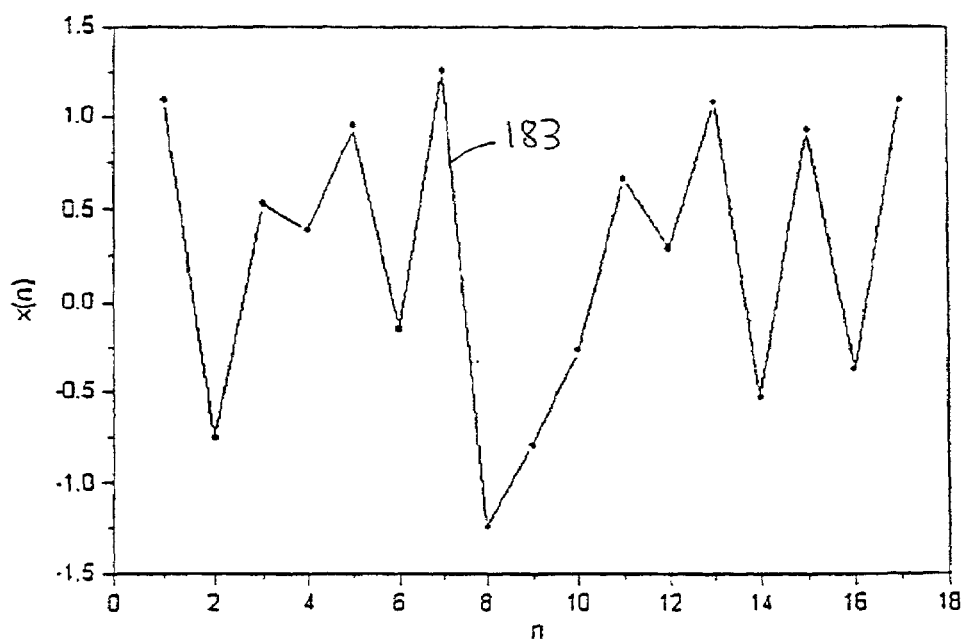

The Lozi attractor phase portrait 170 at (α, β)=(1.7, 0.5) is shown in FIG. 16 with a period-16 unstable orbit 172 marked on its structure. The forms 180–183 of four different period-16 unstable orbits 172 are presented in FIGS. 17(a)–17(d).

Thus, by analysing bifurcation diagrams, a list of unstable orbits can be formed as shown in, e.g., Tables 1–4.

Referring back to FIG. 2 and step S08 of FIG. 5, the chaotic signal generating unit 12 selects a subset of unstable orbits from the list from the registry 26 to use the subset as a subset of chaotic signals for multiple access communication. The selection of the subset of the unstable orbits from the registry 26 is performed by the control device 24 based on concrete requirements on the signal properties and the conditions of their extraction by different users. For example, a subset of chaotic signals may be formed from the unstable orbits of the same cyclic period, having a certain degree of instability. In this case, chosen cycle eigenvalues are not less than a predetermined value.

Figure 18:
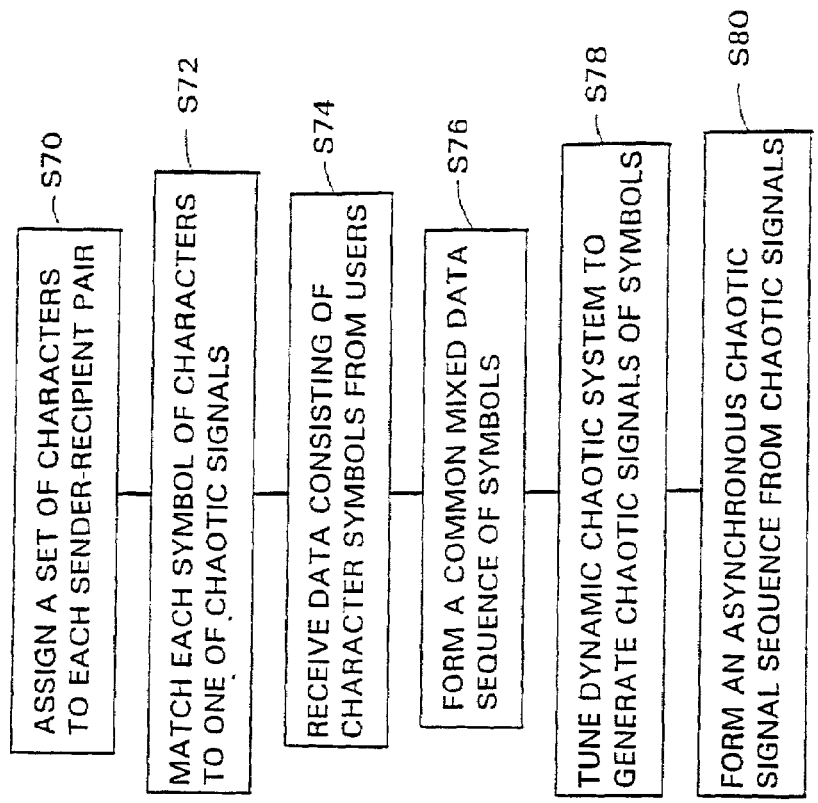
FIG. 18 is a flowchart showing an embodiment of a method for forming an asynchronous chaotic signal sequence in accordance with the present invention.

FIG. 18 shows an embodiment of the method for selecting a subset of unstable orbits, and forming the asynchronous chaotic signal sequence or stream 36 for the multiple-access communication system 2. Prior to starting communication, the chaotic signal generating unit 12 assigns to each sender-recipient pair of users of the communication system 2 a set of characters for forming its data or messages (S70). The symbols of the characters differ from those of at least some other sender-recipient pairs of users. A set of characters may include an alphabet and/or numbers.

When assigning a set of characters to each sender-recipient pair of users, for example, in the simplest case, characters of all sender-recipient pairs of users may be binary, and symbols 0 and 1 of these characters may be designated by code words different for each sender-recipient pair of users. In a more complicated case, the system may give priority to some users for, e.g., special services. In such a case, characters with specially chosen symbols, e.g., code words in the case of binary alphabets, are assigned to those priority users. The outlook of the chosen symbols is at once indicative of the priority of data transmitted by these symbols. In other case, priority users may be given characters having more symbols than the characters of other non-chosen users. In so doing, each symbol of such special characters bears more information than a symbol of any other characters. For example, common characters may have binary symbols, and the special characters may have octanary symbols. In other cases, for messages of a priority user, a condition may be introduced to provide a transmission of no less than a predetermined number of symbols per time unit. Further, each priority user may be provided with several chaotic signals for each character symbol.

Also, some characters may be given a priority. Each user may obtain a priority when the user addresses to these characters during transmission. For example, when calling an ambulance car or a fire brigade, these characters may be addressed. All that is mentioned above about the priority users' characters is suitable also for priority characters, as is evident for those skilled in the art.

Another example of assigning a set of characters to each sender-recipient pair of users is to chose a vector of the dynamic system parameter values $\mu_1$ for i-th sender-recipient pair of users. A set of $M_1$ unstable orbits of the dynamic system chaotic attractor is selected to correspond to the vector values $\mu_1$ of the system parameters.

For example, for two pairs of users a logistic parabola map (1) may be taken with the parameter values $\mu_1$=3.95 and $\mu_2$=3.97 as the dynamic systems, respectively. In order to organize the signal systems for other pairs of users, the dynamic systems with corresponding different parameter values are taken.

Another example is to use different dynamic systems for different sender-recipient pairs. For example, for the first pair of users the Henon map (2) may be used with a parameter value vector $\mu_1$=($\alpha$, $\beta$) and for the second pair of users the Lozi map (3) may be used with a parameter value vector $\mu_2$=($\alpha$, $\beta$).

When the number of users is determined by the number K of employed symbols, and the set of characters for each i-th user has the radix $M_1$, then the total number of necessary symbols satisfies the following relationship:

$$N = \sum_{i=1}^{K} M_1$$

In general, the set of characters for various users are selected mutually non-overlapping, i.e., a system of orbits is selected as a character for i-th virtual channel, which orbits are not employed in the set of characters of j-th virtual channel.

As a reservoir of unstable skeletal orbits, instead of using chaotic attractors of dynamic chaotic systems with chaos which have one positive Lyapunov exponent, chaotic attractors of dynamic systems with hyperchaos, i.e., chaotic attractors with two unstable directions having two positive Lyapunov exponents, may be used. As compared to the attractors having one positive Lyapunov exponent, the attractors with hyperchaos have essentially more powerful set of unstable skeletal orbits.

After assigning a set of characters to each sender-recipient pair of users, each symbol of the characters is matched to one of chaotic signals from their list in the registry 26 (S72). In this case different variants are possible. For instance, each symbol of each character may be matched with one of chaotic signals of the same period, if there are no priority users or characters among all users or characters. When priority is given to users or characters, symbols of priority uses' characters or symbols of priority characters may be matched with chaotic signals having shorter period, or with several chaotic signals for each symbol of these characters.

Once each symbol in each set of characters is matched with one of chaotic signals from the list, the chaotic signal generating unit 12 forms an asynchronous chaotic signal sequence 36 in the multiple-access communication system 2 as follows. Each user forms data or information messages using its assigned set of characters, and transmits to the chaotic signal generating unit 12 the data consisting of the symbols of the characters. The chaotic signal generating unit 12 receives by the asynchronous data mixer 22 the data consisting of the character symbols from multiple users 18, 19 (S74).

The asynchronous data mixer 22 forms a common mixed data sequence 32 from the character symbols being received from the users 18, 19 (S76). The sequence of the symbols follows in a predetermined order. This order may be the one-after-another order when the character symbols from different users are set out in a common queue as they are received by the data mixer 22. When the system gives priority to uses or characters, symbols of priority users' characters or symbols of priority characters may be transmitted immediately without any queue. If symbols of several priority users or characters come simultaneously to the mixed mixer 22, they may be set out, in accordance with their priorities, into their own sequence which will be transmitted before the other symbol queue.

The mixed data sequence 32 is transferred to the control device 24 which is a converter of symbols to control actions provided to the dynamic chaotic system 28. The control device 24 successively tunes the dynamic chaotic generator 28 to generate the chaotic signals, each of which corresponds to the character symbol of the mixed data sequence 32 (S78). Thus, in the communication channel 16, an asynchronous chaotic signal sequence 36 is formed from the chaotic signals generated successively (S80). A specific embodiment of the control device 24 depends on the way the dynamic chaotic system 28 is adjusted to one or other unstable periodic orbit.

Figure 19:
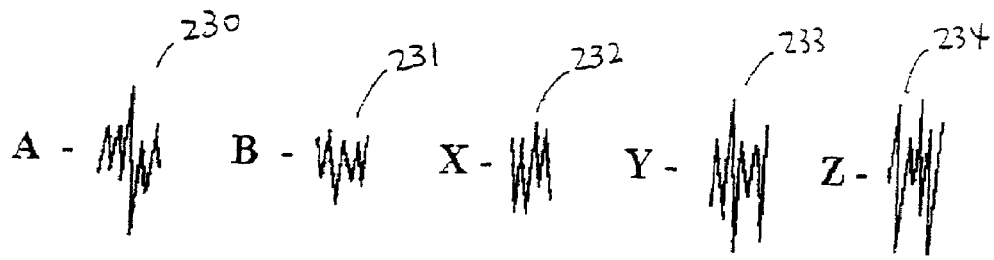
FIG. 19 is a diagram illustrating examples of periodic unstable orbits corresponding to symbols used in the communication system shown in FIG. 1.
Figure 20:
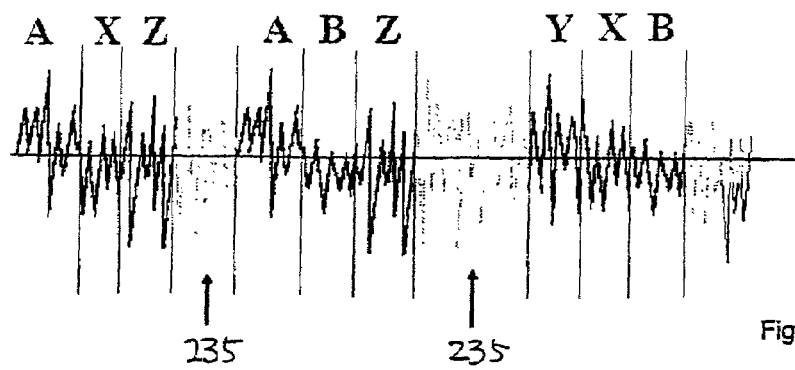
FIG. 20 is a diagram illustrating an example of an asynchronous chaotic signal sequence transmitted in the communication system shown in FIG. 1.

An example of forming chaotic signals is described referring to FIGS. 1, 19 and 20. At the transmitting side 4, first user 18 and second user 19 are connected to the chaotic signal generating unit 12. At the receiving side 6, third user 20 and fourth user 21 are connected to the chaotic signal receiving unit 14. In this example, a set of characters consisting of three symbols X, Y and Z is assigned to a first pair of the first user 18 and the third user 20; and a set of characters consisting of two symbols A and B is assigned to a second pair of the second user 19 and the fourth user 21. As shown in FIG. 19, to each of these five symbols, its own periodic unstable orbit 230–234 corresponds.

In order to transmit a message "XZZYX" from the first user 18 to the third user 20, a dynamic chaotic system is utilized in the chaotic signal generating unit 12. The dynamic chaotic system generates unstable periodic orbits 232–234 which correspond to these character symbols as shown in FIG. 19. Similarly, in order to transmit a message "AABB" from the second user 19 to the fourth user 21, a dynamic chaotic system is utilized in the chaotic signal generating unit 12 to generate unstable periodic orbits 230, 231.

The chaotic signal generating unit 12 may use a single dynamic chaotic system 28 as shown in FIG. 2 to generate all chaotic signals 230–234 corresponding to the character symbols of both the first and second pairs of users. When signals of the character symbols from both pairs of users enter the inputs of the data mixer 22 mixes the character symbols and generates the mixed data sequence 32. As receiving each symbol of the mixed data sequence 32, the control device 24 switches and tunes the dynamic chaotic system 28 to generate unstable periodic orbits 230–234 corresponding to the symbols depending on what the symbol comes at this moment. As a result, at the output of the chaotic generator 28, an asynchronous chaotic signal sequence 36 of unstable periodic orbits is formed in time domain, consisting of a succession of periodic orbits and chaotic motion fragments. The chaotic signal sequence 36 enters the communication channel 16.

The "own" unstable orbits may follow each other, or alternate or interleaved with "alien" unstable orbits or non-informative intervals. Such an asynchronous sequence corresponding to the symbol sequence "AXZABZYBX" is exemplified in FIG. 20. Herein, time intervals corresponding to data pauses are represented by a gray tone or non-information intervals 235.

In order to transmit one symbol, the step of generating the corresponding chaotic signal may be performed more than once.

Figure 21:
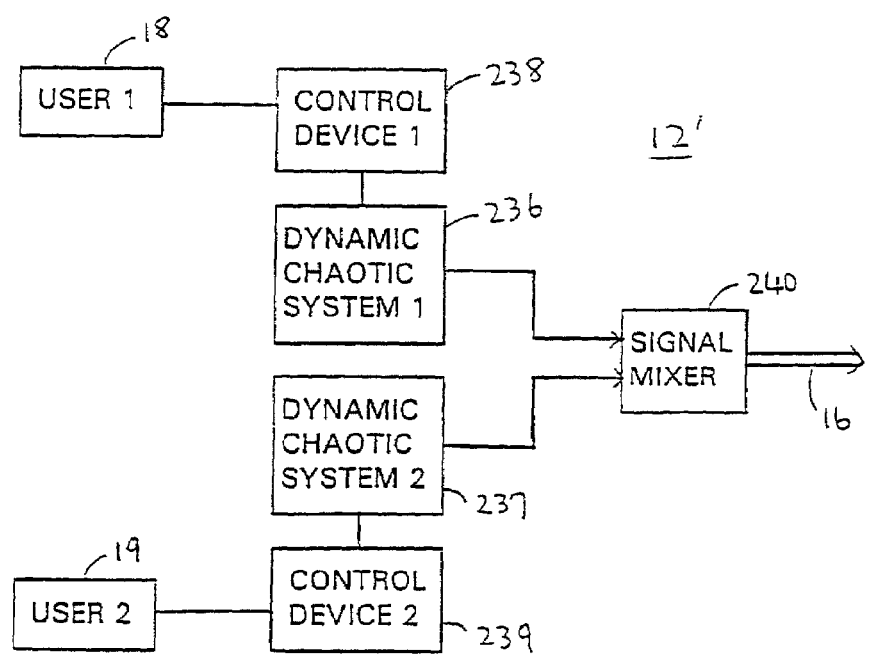
FIG. 21 is a block diagram illustrating another embodiment of the chaotic signal generating unit.

As shown in FIG. 21, the chaotic signal generating unit 12' may comprise first and second chaos generating systems 236, 237, first and second control devices 238, 239 and a signal mixer 240. in this case, the first chaos generating system 236 generates chaotic signals 232–234 which correspond to the character symbols of the first pair of users 18 and 20, and the second generating system 237 generates chaotic signals 230, 231 which correspond to the character symbols of the second pair of users 19 and 21, as shown in FIG. 19. When signals of the character symbols from both pairs of users enter the inputs of the chaotic signal generating unit 12', the control devices 238, 239 switches and tune the respective chaotic generators 236, 237 to generate unstable periodic orbits 230, 231 from the second chaotic system 237 and unstable orbits 232–234 from the first chaotic system 236. Then, the unstable orbits are mixed by the signal mixer 240. As a result, an asynchronous sequence corresponding to the symbol sequence 36 "AXZABZYBX" shown in FIG. 1 enters the communication channel 16.

The above and following descriptions are made based on the chaotic signal generating unit 12 shown in FIG. 2. However, the present invention may use the chaotic signal generating unit 12' shown in FIG. 21 in a similar manner to the unit 12 shown in FIG. 2.

In the absence of information data, the dynamic chaotic system 28 is in a chaotic attractor mode, and a chaotic signal is formed at the system output. Once some information data symbol comes to the input of the control device 24, the control device 24 tunes or "pushes" the dynamic chaotic system 28 onto the unstable orbit corresponding to the input data symbol, e.g., the code of this symbol. Thus, a signal is formed at the output of the chaotic generator 28, which is a periodic sample sequence making the chaotic signal.

In accordance with the present invention, the tuning of the dynamic chaotic system 28 to generate a required chaotic signal is performed by a step-by-step iterative process of the dynamic chaotic system 28.

Figure 22:
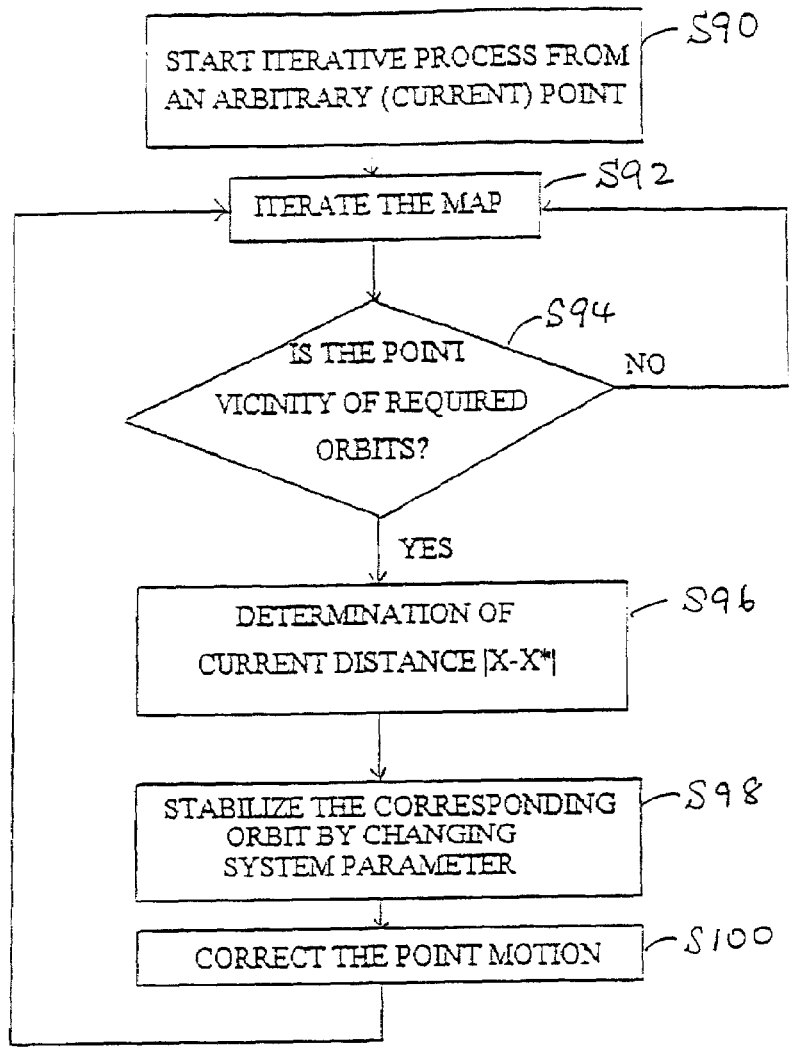
FIG. 22 is a flowchart illustrating an example of an iterative process.

Referring to FIG. 22, the step-by-step iterative process is started by changing the initial conditions of the dynamic chaotic system 28 so that the iterative process starts from an arbitrary point, i.e., current point, in the phase space of the dynamic chaotic system 28 that contains an unstable periodic orbit required in accordance with the received symbol of the mixed data sequence 32 from the data mixer 22 (S90).

Then, the map is iterated (S92). During the iterative process of the dynamic chaotic system 28, the control device 24 finds a point in the phase space which belongs to the required unstable periodic orbit (S94), and which is metrically and evolutionally closest to the point representing the current state of the dynamic chaotic system 28 in the phase space. It is preferable to find the closest point to the current state point.

Figure 8:
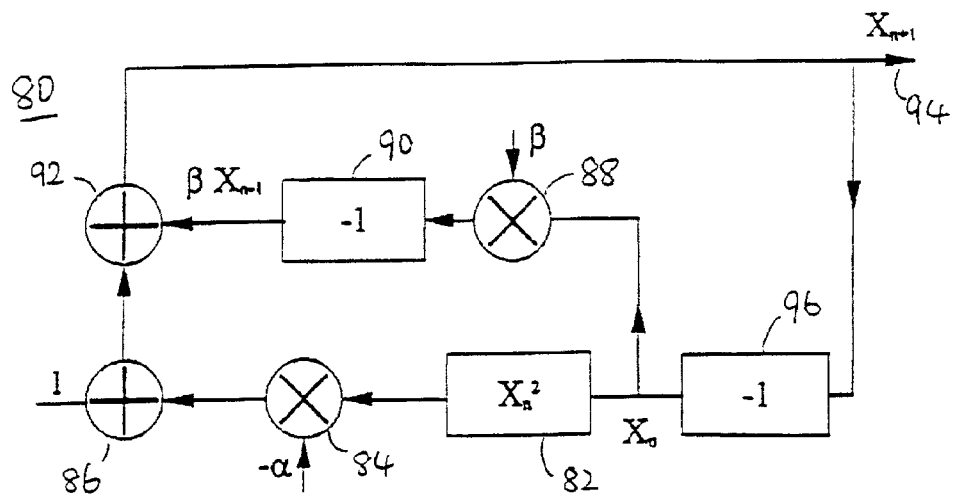
FIG. 8 is a block diagram showing an example of a dynamic chaotic system according to a Henon map.
Figure 14:
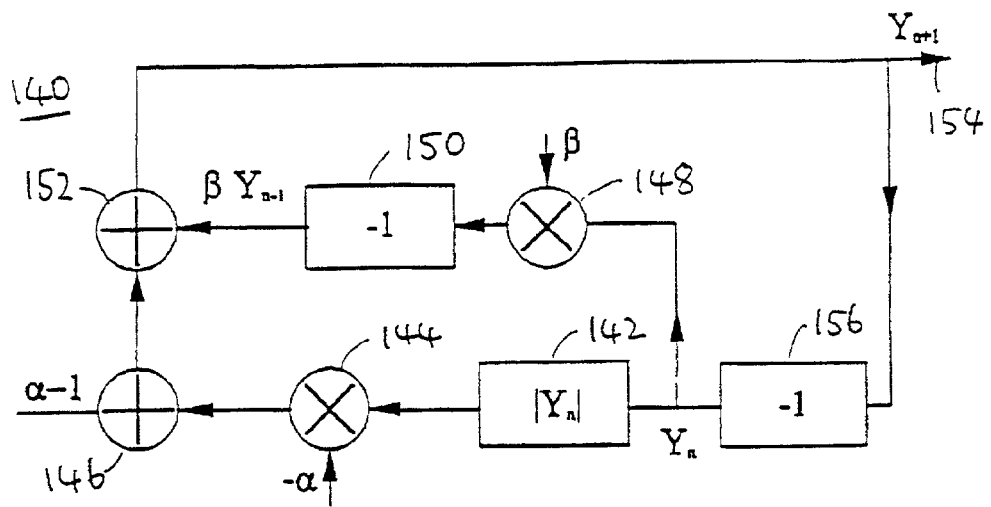
FIG. 14 is a block diagram showing another example of a dynamic chaotic system according to a Lozi map.

This iterative process is performed not continuously but by separate steps because a circuit of the chaotic generator 28 of any complexity degree has a one-tact delay element 64, as can be seen in FIGS. 4, 8, and 14. During the iterative process, when some trajectory point appeared in the iterative process falls into a predetermined vicinity of the required unstable periodic orbit (S94), the control device 24 determines the current distance between the current point X and the required unstable periodic orbit X* (S96). Then, it stabilizes the corresponding unstable periodic orbit by changing the system parameter (S98). In other words, some point of the orbit obtained in the iterative process occurs in the vicinity of the required unstable periodic orbit corresponding to the character symbol transmitted at the moment.

The stabilization of the unstable periodic orbit is performed by changing at least one system parameter of the dynamic chaotic system 28, so that the point of the dynamic chaotic system phase space reflecting the current state of the dynamic chaotic system 28 moves onto the stable manifold of the required unstable periodic orbit.

In so doing, it is preferable that the at least one system parameter is changed by correcting the point motion in the dynamic chaotic system phase space on at least one iteration step during the period of the unstable periodic orbit (S100).

The correction of the point motion in the dynamic chaotic system phase space is preferably performed on each iterative step during the period of the unstable periodic orbit.

The control action procedure by the control device 24 consists of three phases. A first phase is a system transition from chaotic motion to the required unstable periodic orbit. A second phase is holding the chaotic generator 28 on the required unstable periodic orbit. A third phase is an after-effect, i.e., a switching off and relaxation of the chaotic generator 28 to the chaotic state. From the viewpoint of the information rate, it is desirable to minimize the first phase duration. The second phase is the operation. Its duration is determined by the reception conditions. Instead of the third phase, a control action for the next information symbol may be performed.

The stabilization of the corresponding unstable periodic orbit (S98) may be performed in different ways.

First of all, such a stabilization may be performed by a technique proposed in by Ott, E. Grebogi, C. Yorke, J. A., in Phys. Rev. Lett. V. 64 1196–1199, 1990. This technique is called OGY controlling. An idea of this technique is in a small perturbation of a system parameter, which leads to a local stabilization of the unstable orbit.

Figure 23:
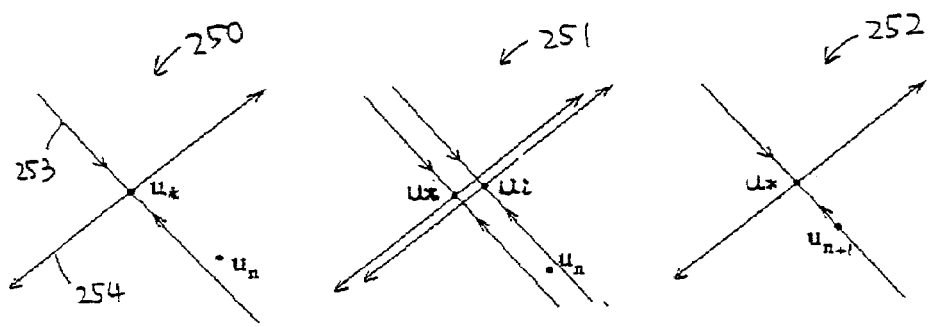
FIG. 23 is a diagram illustrating an example of a process for controlling the properties of the dynamic chaotic system shown in FIG. 2.

FIG. 23 illustrates an example of a two-dimensional discrete dynamic system $u_{n+1}=F(u_n, p)$. The unstable cycle point u. belonging to the chaotic attractor is characterized by two manifolds, stable 253 and unstable 254. If the representative point $u$, of the existing chaotic trajectory fits into a neighbourhood of the given orbit 254 as seen in 250, then after a corresponding system modification by varying the parameter $p=p+\delta p$ as seen in 251, it is possible to "locate" the representative point $u_{n+1}$ exactly on the stable manifold 253 and thus to provide the convergence of the trajectory to the required orbit as seen in 252. The value of perturbation δp is calculated according to the following relation:

$$\delta p = G \cdot (u_1 - u.) \quad (4)$$

where G is a value determined by the characteristics of the stabilized orbit, i.e., the Jacobian matrix eigenvalues, and by the value of partial derivative $\partial F/\partial p$ in the point $u_*$. An important parameter of the regular stabilization procedure is the controlling region width, i.e., those values of $|u_1-u_*|\beta$, for which the stabilization algorithm is "turned on". If the distance to the point $u_*$ is above a predetermined value $\epsilon$, then the system remains in the chaotic attractor mode until the condition of proximity to the required point of the stabilized orbit is fulfilled. Therefore, by using this standard OGY procedure, the duration of the first phase of generation of the required unstable orbit can be rather long.

Application of the procedure of stabilization of unstable orbits corresponding to the character symbols of the sequence allows formation of the data sequence with the required signal structure.

Figure 24:
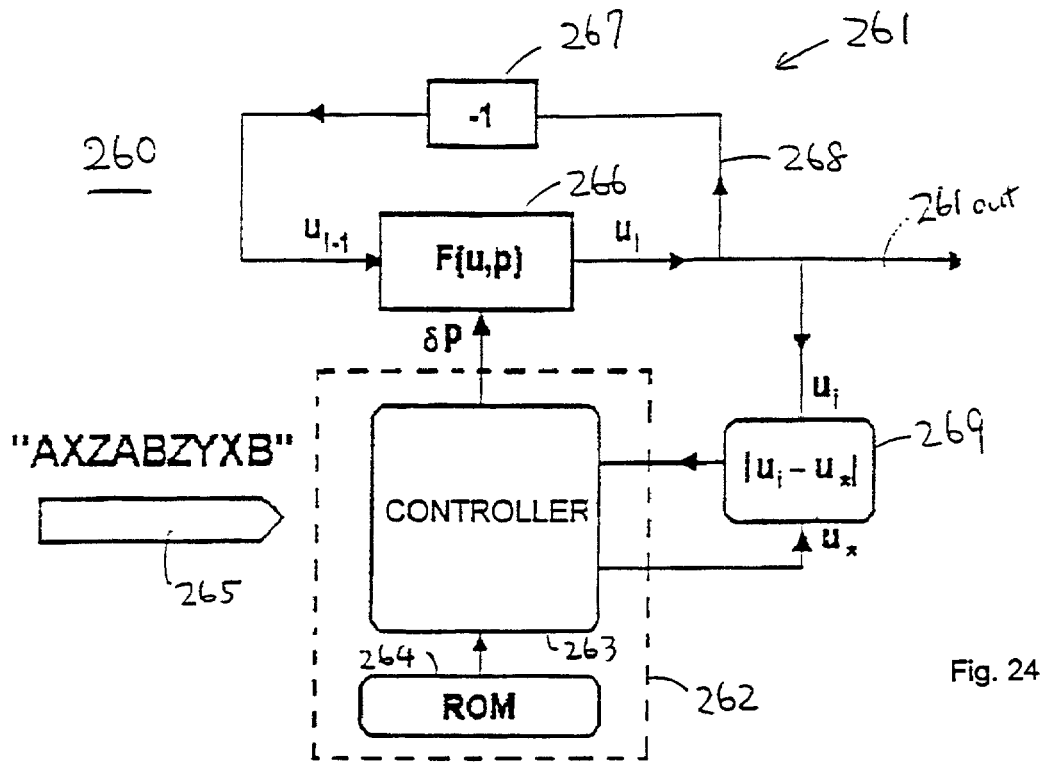
FIG. 24 is a block diagram showing another embodiment of the chaotic signal generating unit.

FIG. 24 shows an example of a chaotic signal generating unit 260 forming such a sequence using the standard OGY procedure. The chaotic signal generating unit 260 comprises a data mixer (not shown), a dynamic chaotic system 261 and a control device 262. The control device 262 receives a sequence of symbols 265 and controls the dynamic chaotic system 261 in accordance with the sequence 265.

The dynamic chaotic system 261 for generating discrete chaotic signals is represented by the function F(u, p) 266 with a unit time delay 267 in the feedback loop 268. The control device 262 has a controller 263 and a Read Only Memory (ROM) unit 264. In the ROM 264, information on the controlling procedure parameters is stored. The information includes that of unstable orbits, e.g., coordinates of the cycle point us to which the trajectory must come near, and parameter G necessary to calculate the perturbation. A function $|u_1-u_*|$ 269 is also provided which calculates the value $|u_1-u_*|$ from the output of the dynamic chaotic system 261 and inputs it to the controller 263.

Before receiving data symbol sequence 36, the dynamic chaotic system 260 is in the chaotic attractor mode, and at its output chaotic samples $u_1$ are formed. When a next symbol belonging to data characters is fed to the input of the control device 262, the controller 263 compares step-by-step the output sample amplitude of point $u_1$, or all current coordinates of point u, in the case of a many-dimensional system, with the value of the corresponding point $u_*$. When the controller 263 finds that a current point is close to the required points, the controller 263 starts the parameter correction of dynamic system (4), and at the generator output $261_{out}$, a sample corresponding to a cycle point of the stabilized orbit is formed. This stabilization procedure has relatively long duration of the first phase, i.e., transient chaotic process.

Figure 25:
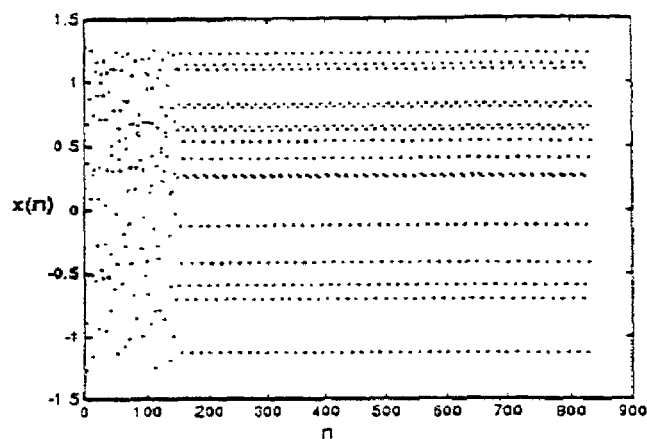
FIG. 25(a) is a diagram showing an example of a procedure for stabilizing a Henon attractor cycle.
FIG. 25(b) is a diagram showing an enlarged fragment of the diagram of FIG. 24(a)
FIG. 25(c) is a diagram showing another enlarged fragment of the diagram of FIG. 24(a)
Figure 25:
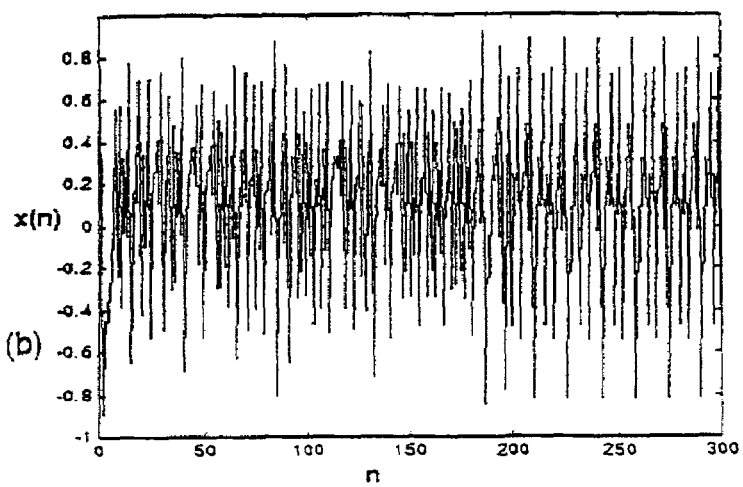
Figure 25:
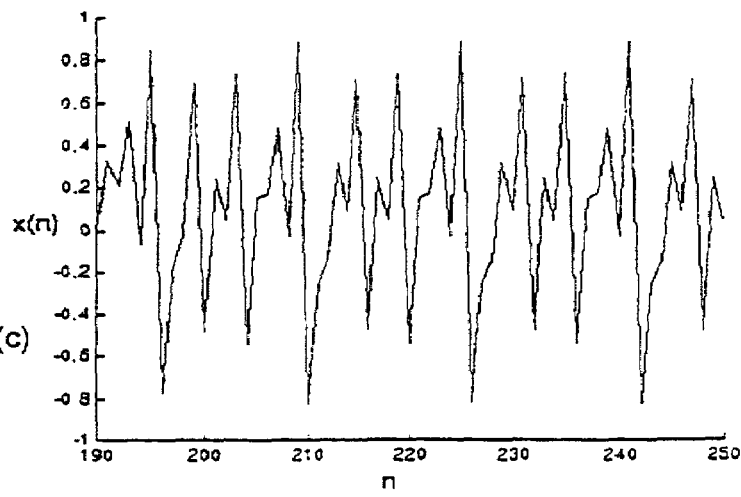

FIGS. 25(a)–25(c) show the stabilization procedure for one of the period-16 orbits of Henon attractor (2), wherein n is number of iteration. As seen from FIGS. 25(a) and 25(b), the occurrence at the limit periodic orbit with period 16 is preceded by a sufficiently long transient process of about 150 iterates.

Long periodic unstable orbits, e.g., in the case of discrete dynamic systems, have a large number of cycle points. For stabilization of such long periodic unstable orbits, it is preferable to use a stabilization procedure which allows the motion correction not once a period but many times a period, e.g., at every cycle point. When the motion correction is performed at every cycle point, the controlling parameter is corrected for each other cycle point of the stabilized orbit. In this case, the expression for the parameter variation is expressed as follows:

$$\Delta p = p_i - p^* = -\rho \cdot G_{N^*\{i/n\}}(u_i - X_{N^*\{i/N\}}) \cdot W(\delta - [G_{N^*\{i/N\}}(u_i - X_{N^*\{i/N\}})])$$

where $W(\alpha)=0$ for $\alpha<0$, 1 for $\alpha>0$. $X_j$ are cycle points of the controlled orbit. The function W may be the function of not only the absolute value of the current coordinate deviation $G_{N^*\{i/n\}}(u_i - X_{N^*\{i/N\}})$ from the cycle point, but have a more complex dependence on the metric deviation. $p^*$ is the controlled parameter. $\delta$ is a characteristic constant of the controlling procedure defining the range of variation of the system parameter $p^*$. $\rho$ is a parameter of controlling, which defines how close the current point is to the required point in metric sense in order to start the stabilization procedure, and has the following values:

$\rho=1$ for $|(u_i-X_{N^*\{i/N\}})|<\epsilon$ and $\rho=0$ for $|(u_i-X_{N^*\{i/N\}})|>\epsilon$ The dynamic chaotic system 261 is iterated, i.e., a next point is obtained at the output of the generator $u_{i+1}=F(u_i, p_i)$ with a different, not the initial value of the controlling parameter. The modification of the value of this parameter is assumed to bring the system to the stable motion along the required trajectory.

Then the parameter variation for the next step, i.e., for i=i+1, is calculated and the process is repeated again and again. It turns out that sooner or later the infinite series of u will consist exclusively of ordered sets $\{X_i\}$, i.e., a stable limit orbit reproducing itself in time domain. The distribution of the establishment time as of a random controlling value is exponential and essentially decreases in average with increasing the admissible parameter variation $\delta$.

Figure 27:
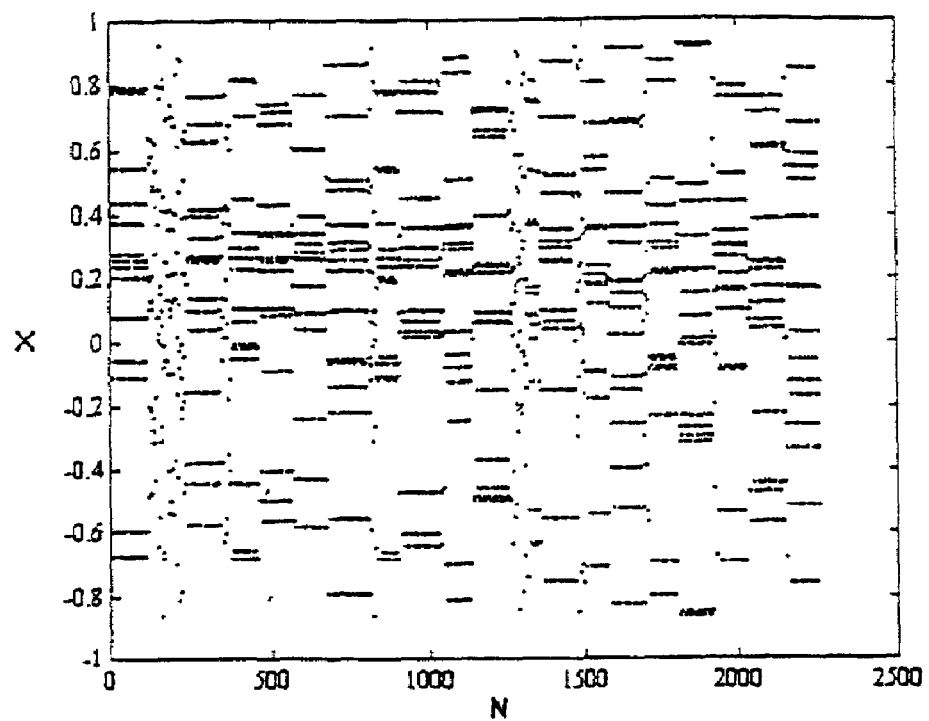
FIG. 27(a) is a diagram showing an example of a procedure for stabilizing Lozi attractor orbits.
FIG. 27(b) is a diagram showing another example of a procedure for stabilizing Lozi attractor orbits.
Figure 27:
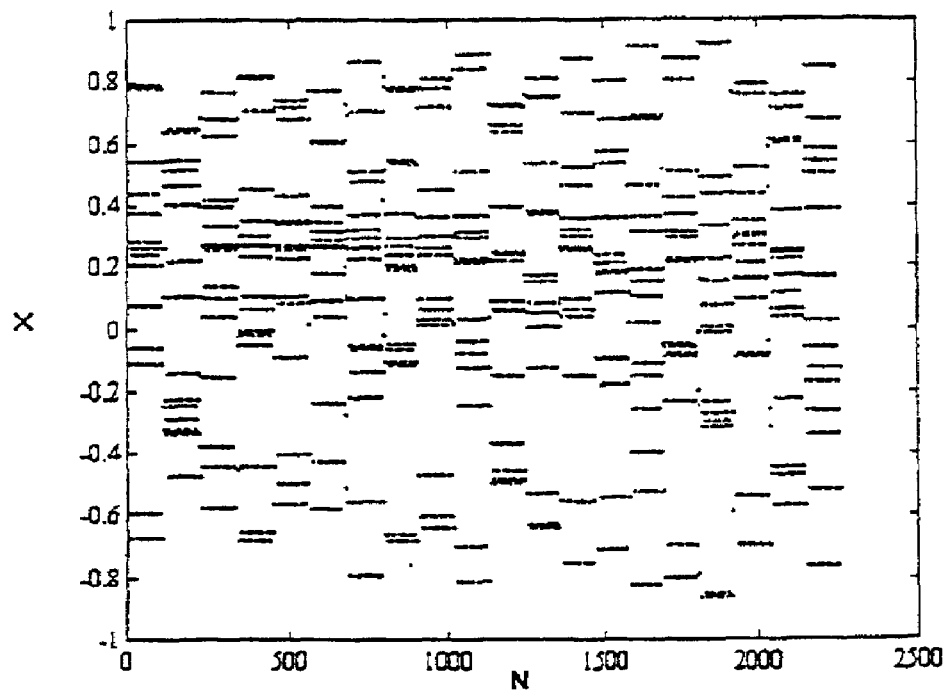

In terms of the time expenses by the motion stabilization, by using the standard OGY controlling the system goes through "expensive" transient process even if the variations of the parameters $\delta$ and $\gamma$ is large. FIG. 27(a) shows this phenomenon where the described procedure is applied to the stabilization of 4 different periodic orbits of period-16 of Henon attractor (3). In FIG. 27(a), the switching between 4 selected unstable orbits is performed in a random order. The duration of staying at each of these orbits is 8 periods. In the formed signal, there are fragments corresponding to sufficiently "fast" switching, practically with no transient, as well as the fragments indicating of the absence of stabilization of certain periodic orbits.

In order to increase the information transmission rate, it is desirable that the transient process by switching between the unstable orbits in the chaotic generator is reduced as much as possible. To this end, a modified method of orbit controlling which improves the standard procedure used in FIG. 24 is described below.

Before turning on the stabilization procedure, the most "close" cycle point is found for which the controlling procedure should be turned on. The "closeness" is understood here not only in metric sense, but also in the sense of evolutionary properties of the dynamic system. To find this closest point, the following functional is used with which the minimization problem is solved at this preliminary phase:

$$(q, u_i) = \alpha \times ((K_q(u_i - X_q))^2) + (1-\alpha) \times (u_i - X_q)^2$$

where $\alpha$ is a coefficient and $0<\alpha<1$.

The problem is solved on $i(u_1)=\text{argmin}(q, \text{functional}(q, u_1))$. The point found by the functional minimization is used further as the "target" for the controlling at the first step. The rest of the controlling procedure is the same as in the procedure used in FIG. 24.

In this example, the best results from the viewpoint of the controlling establishment time are achieved at the values of a near 0.5. Without the dynamic term, i.e., at $\alpha=0$, the average time of the periodic mode establishment increases.

The advantages of this improved procedure will be easily understood on the following example. Let the required orbit generation be to begin when the dynamic chaotic system is near one of the cycle points. This situation is typical for large period orbits, some points of which can be located close to each other in the dynamic system phase space. The standard OGY stabilization method in its inner cycle point list will not, in general, treat this point the first one, hence the system will recognize this point as a one that needs correction. The system will go through a potentially long transient process. By contrast, this modified procedure recognizes each cycle point as its "own", and there will be no transient.

FIG. 27(a) shows a diagram of the orbit switching using the standard OGY procedure for Lozi map (3). In FIG. 27(a), twenty period-16 orbits are randomly switched between. FIG. 27(b) shows the same controlling performed using the modified procedure with the parameters fixed at $\alpha=0.5$, $\delta=0.5$.

Figure 26:
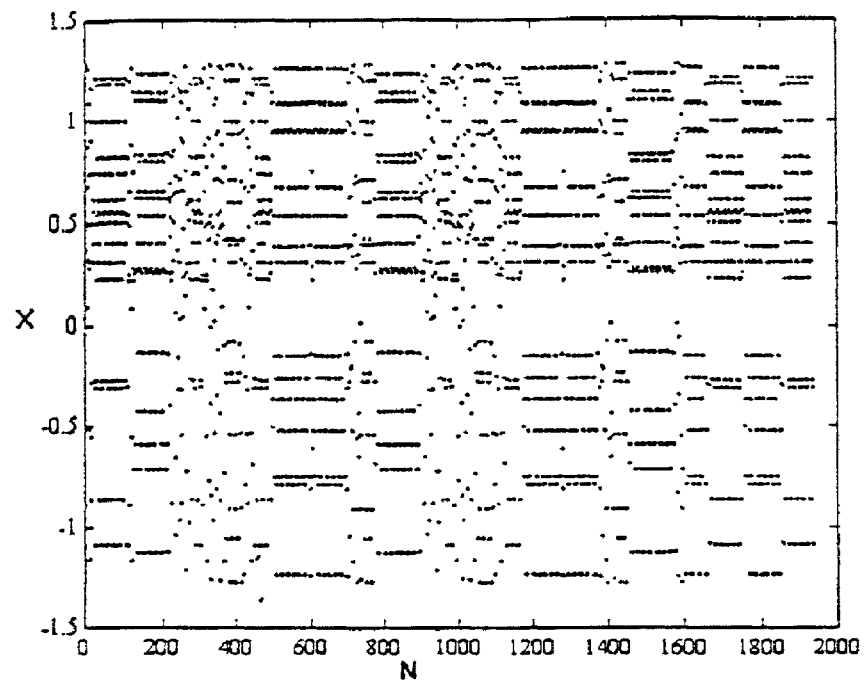
FIG. 26(a) is a diagram showing an example of a procedure for stabilizing Henon attractor orbits.
FIG. 26(b) is a diagram showing another example of a procedure for stabilizing Henon attractor orbits.
Figure 26:
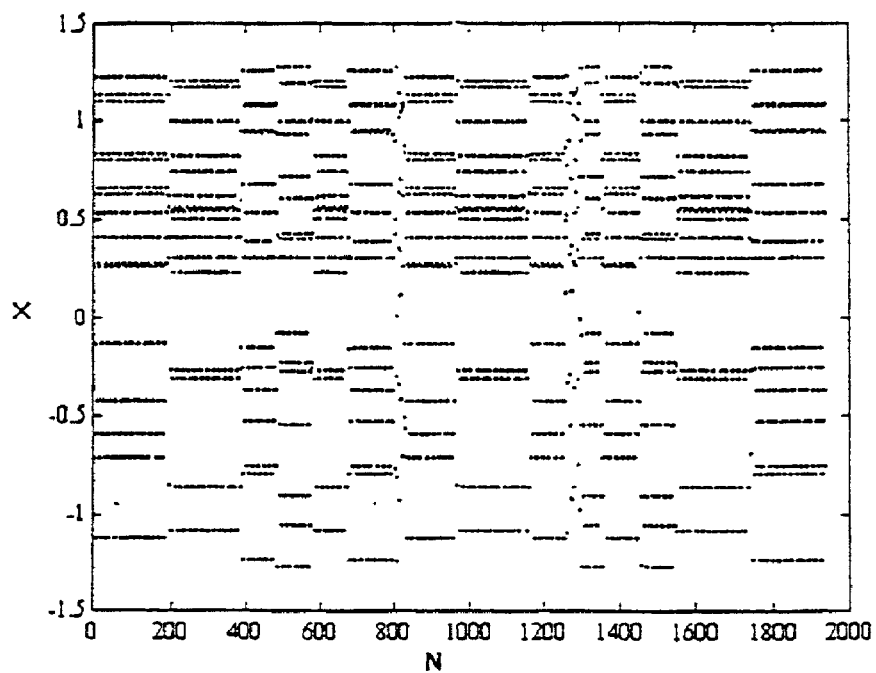

FIG. 26(b) shows an example demonstrating successive switching between 4 different period-16 orbits for Henon attractor in which the parameter values are $\alpha=0.5$, $\delta=0.3$.

Figure 28:
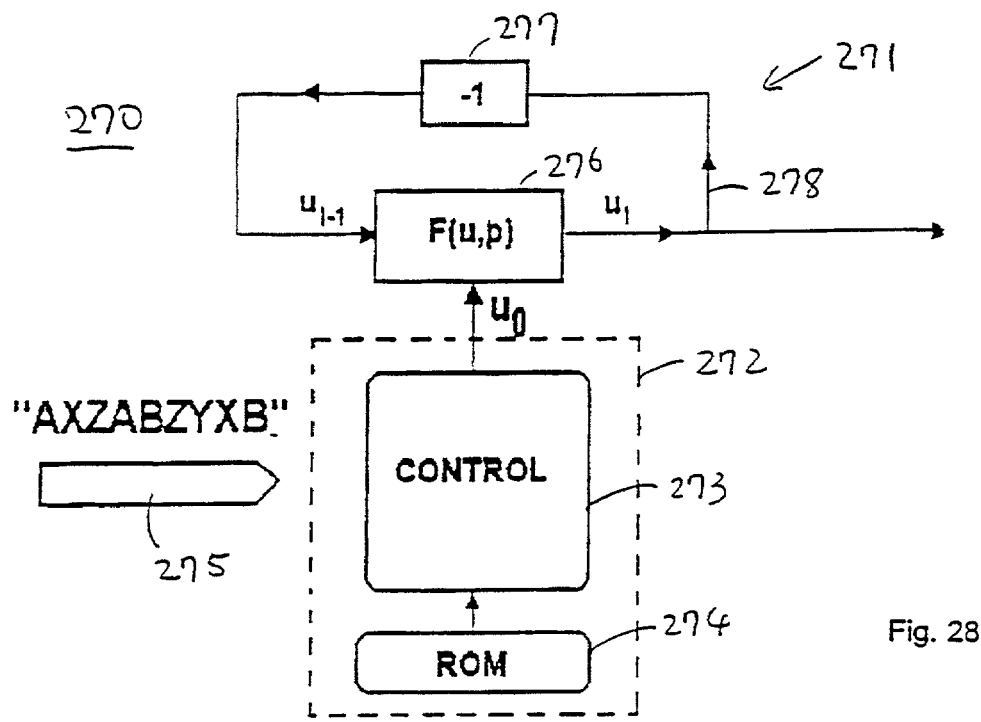
FIG. 28 is a block diagram showing another embodiment of the chaotic signal generating unit.

FIG. 28 shows another example 270 of a chaotic signal generating unit for generating asynchronous chaotic signal sequences using the modified procedure of controlling by the initial conditions. The chaotic signal generating unit 270 comprises a data mixer (not shown) for generating a symbol sequence 275, a dynamic chaotic system 261 and a control device 272. The control device 272 receives the symbol sequence 275 and controls the dynamic chaotic system 271.

The dynamic chaotic system 271 for generating discrete chaotic signals is represented by the function F(u, p) 276 with a unit time delay 277 in the feedback loop 278. The control device 272 has a controller 273 and a Read Only Memory (ROM) unit 274 for storing information on the controlling procedure parameters, similar to the ROM unit 264 shown in FIG. 24.

When an information symbol is fed to the input of the controlling device 272, the initial conditions for the chaotic dynamic system 271 are set to one of the cycle points. Due to the orbit instability on the chaotic trajectory, after passing through the points of the used orbit, the dynamic chaotic system 271 gradually "goes away" from the chosen periodic orbit. To compensate the increasing deviations, after deviation of every n cycle periods, the dynamic chaotic system 271 is "adjusted" by setting the phase trajectory point exactly onto the very same cycle point. The number of such adjustments is determined by the required duration of the system staying on the periodic mode corresponding to this orbit. To perform this modified procedure, only one cycle point along with its period is needed to be stored in the ROM unit 274. Hence, this modified procedure is advantageous with respect to the procedures used in FIG. 24. The initial conditions may be adjusted several times a period.

The elements used in the above embodiments may be implemented with digital signal processors, capable to provide generation of individual chaotic signals corresponding to the character symbols of a large number of users.

At the receiving side, each recipient extracts information from received asynchronous chaotic signal sequences. To this end, each recipient is provided with a selecting dynamic chaotic system.

Referring back to FIG. 1, the asynchronous chaotic signal sequence 36 generated by the chaotic signal generating unit 12 is transmitted over the communication link 16 to the chaotic signal receiving unit 14. At the receiving side 6, the chaotic signal receiving unit 14 extracts information directed to a user 20 or 21 connected to the chaotic signal receiving unit 14 from the received asynchronous chaotic signal sequence 36.

FIG. 1 shows only one chaotic signal receiving unit 14. However, the communication system 2 may contain a plurality of chaotic signal receiving units. In such a case, the asynchronous chaotic signal sequence 36 is transmitted to all active chaotic signal receiving units in the communication system 2.

Figure 29:
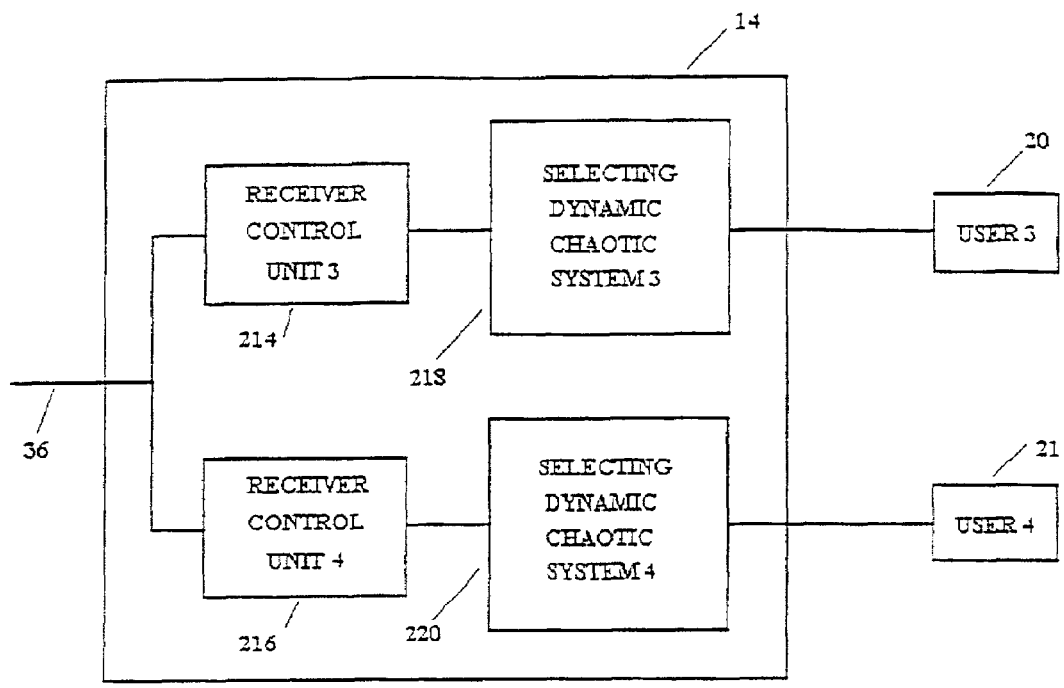
FIG. 29 is a block diagram showing an embodiment of the chaotic signal receiving unit.

FIG. 29 shows an embodiment of the chaotic signal receiving unit 14. The receiving unit 14 provides each user 20, 21 connected thereto with a selecting dynamic chaotic system 218, 220. Each selecting dynamic chaotic system 218, 220 is controlled by its respective receiver control unit 214, 216.

Each selecting dynamic chaotic system 218, 220 has at least one chaotic attractor which possess in its phase space some set of unstable periodic orbits, as it takes place in the dynamic chaotic system of the chaotic signal generating unit 12 at the transmitting side 4 of the communication system 2. Each selecting dynamic chaotic system 218, 220 is capable of being tuned to those unstable periodic orbits of the chaotic signals corresponding to the symbols of the set of characters assigned to the respective user 20, 21 in any sender-recipient pair in which this user 20, 21 takes part.

The selecting dynamic chaotic system 218, 220 may be the same as the dynamic chaotic system 28 of the chaotic signal generating unit 12 at the transmitting side 4. However, since a specific selecting dynamic chaotic system 218, 220 needs to extract only some chaotic signals related to the respective user 20, 21, it is sufficient to construct the selecting dynamic chaotic system to generate only those unstable periodic orbits that match to the required chaotic signals related to the respective user.

Although the selecting dynamic chaotic system 218, 220 and the receiver control units 214, 216 are shown in a single chaotic signal receiving unit 14 in FIG. 1, the communication system may contain a plurality of chaotic signal receiving units, and each selecting dynamic chaotic system and receiver control unit may be provided separately in a different chaotic signal receiving unit. Also, in FIG. 29, each selecting dynamic chaotic system is controlled by its respective receiver control unit. However, a single receiver control unit may control multiple selecting dynamic chaotic systems.

In order for the recipient user 21 to extract the chaotic signals destined to the user 21 from the asynchronous chaotic signal sequence 36, the selecting dynamic chaotic system 220 of the user 21 forms those unstable periodic orbits that correspond to the chaotic signals for the user 21 under the effect of the received chaotic signal sequence 36 and the control of the receiver control unit 216.

Figure 30:
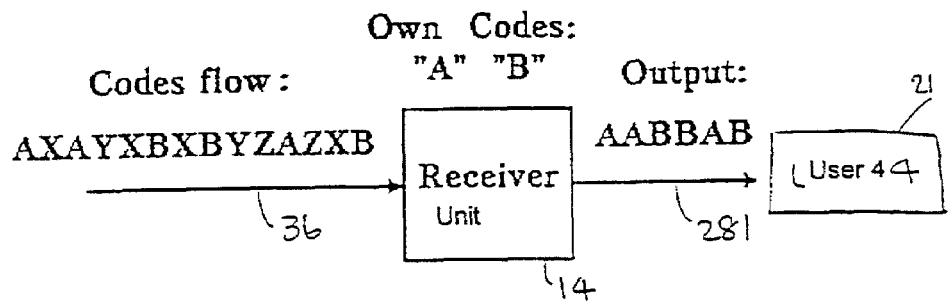
FIG. 30 is a diagram schematically illustrating an example of extraction of signals by the chaotic signal receiver shown in FIG. 1.
Figure 31:
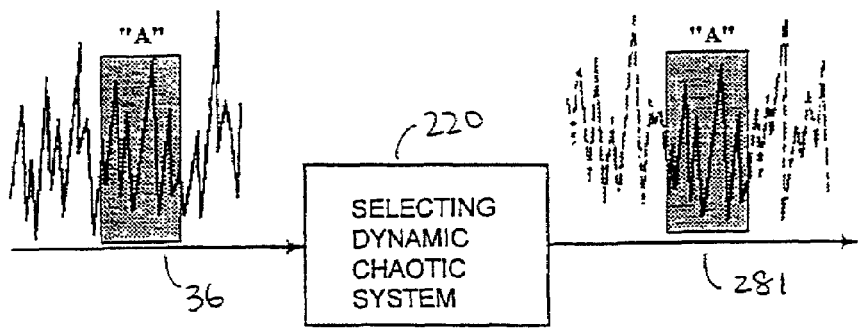
FIG. 31 is a diagram showing an example of the asynchronous stream prior to and after the selecting dynamic chaotic system of the receiver shown in FIG. 1.

FIG. 30 schematically illustrates an example of such an operation. The receiving unit 14 receives the asynchronous chaotic signal sequence 36 "AXAYXBXBYZAZXB" composed of the chaotic signals corresponding to the character symbols of two senders 18 and 19. From the chaotic signal sequence 36, the receiving unit 14 extracts "own" chaotic signals corresponding to the character symbols "A" and "B" of the sender-recipient pair of the users 19 and 21. Thus, the receiving unit 14 outputs a data stream "AABBA" 281 to user 21. In this case, as shown in FIG. 31, the selecting dynamic chaotic system 220 filters the input chaotic signal sequence 36, and passes without distortions only the signals on which the selecting dynamic chaotic system 220 is tuned.

The selection of the required chaotic signals is performed by starting a step-by-step iterative process of the selecting dynamic chaotic system 220 of the recipient 21. As a result of this iterative process, the selecting dynamic chaotic system 220 outputs a signal similar to the "own" signal coming at its input.

Figure 32:
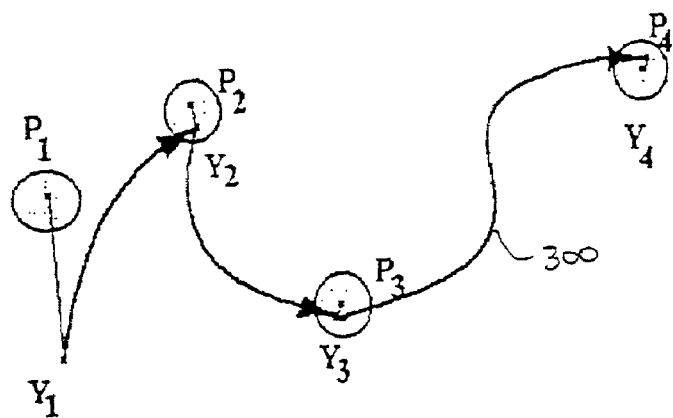
FIG. 32 is a diagram schematically illustrating an example of convergence of an "own" orbit during selection of signals at the receiver.
Figure 33:
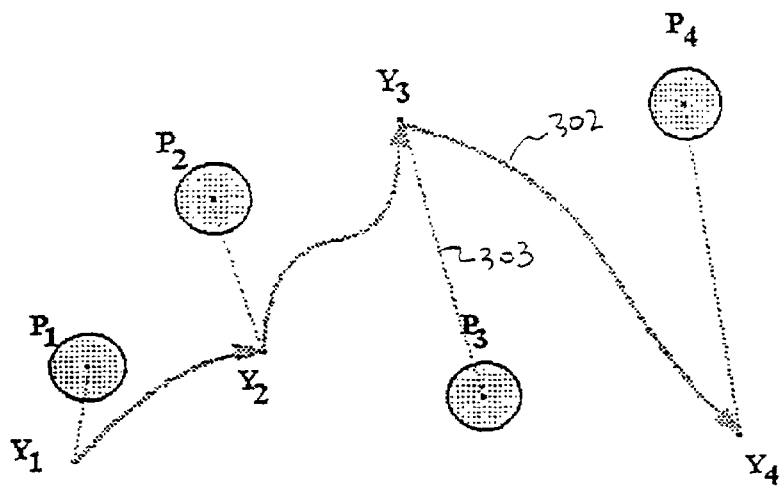
FIG. 33 is a diagram schematically illustrating an example of divergence of the trajectory corresponding to an "alien" signal from the "own" orbit during selection of signals at the receiver.

During the iterative process, as shown in FIG. 32, the selecting dynamic chaotic system 220 of the receiving unit 14 provides convergence 300 of the formed signals $Y_1$–$Y_4$ to its "own" signal corresponding to a pre-selected unstable skeleton orbit represented by points $P_1$–$P_4$. At the same time, as shown in FIG. 33, "alien" signals $Y_1$–$Y_4$ coming to the input of the receiving unit 14 result in natural divergence of the trajectories 302 from the pre-selected unstable orbit represented by points $P_1$–$P_4$ formed in the selecting dynamic chaotic system 220.

The operation of selecting an "own" chaotic signal can be performed in different ways using different circuitry.

Figure 34:
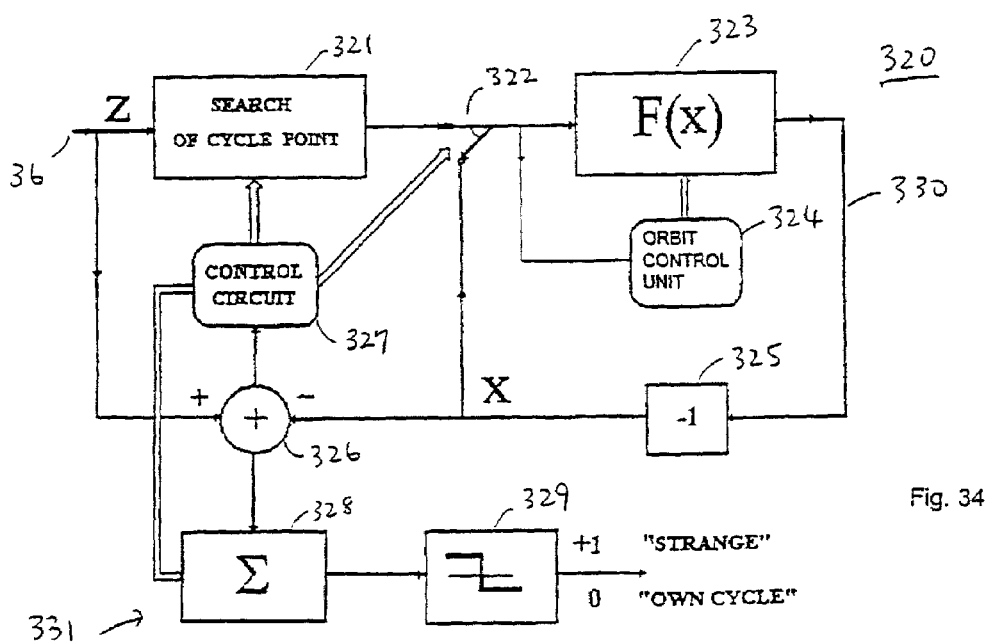
FIG. 34 is a block diagram showing an embodiment of the receiver.

FIG. 34 shows a block diagram of an embodiment 320 of the chaotic signal receiving unit in accordance with the present invention. The receiving unit 320 comprises a selecting dynamic chaotic system F(x) 323, and a receiver control unit including a search unit 321 for searching cycle points, a switch 322, an orbit control unit 324 for controlling the system parameters of the selecting dynamic chaotic system 323, a unit-delay one-tact element 325, an adder 326, a control circuit 327, a summer 328 and a comparator 329.

Figure 35:
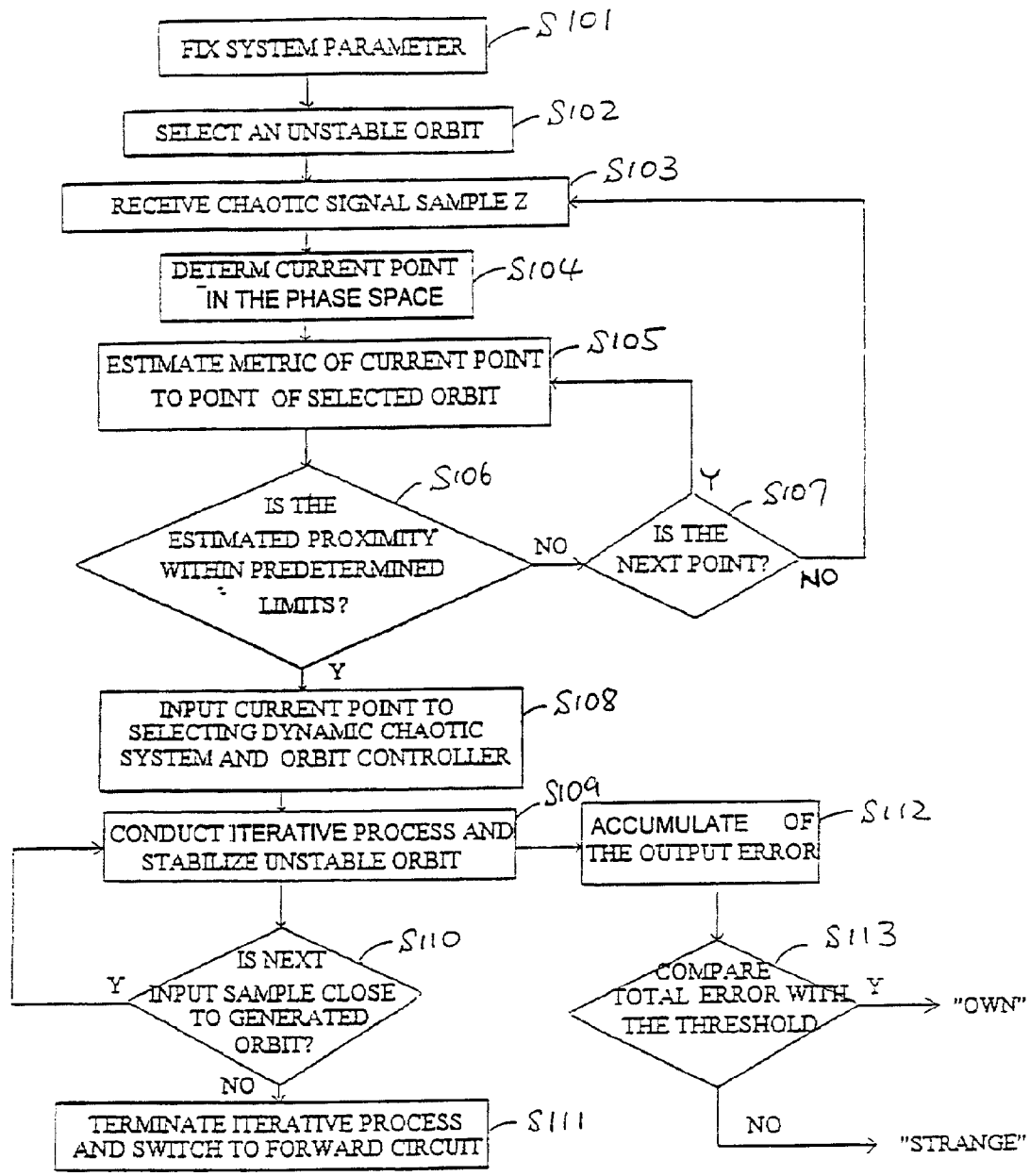
FIG. 35 is a flowchart illustrating an embodiment of a process for extracting "own" signals from the received signals at the receiver.

In operation, as shown in FIG. 35, the receiving unit 320 first selects and fixes system parameters of the chaotic system 323 (S101) so that the selecting dynamic chaotic system 323 generates a chaotic attractor in its phase space which corresponds to the respective user connected to the receiving unit 320. The search unit 321 selects one of the unstable periodic orbit set belonging to the chaotic attractor of the selecting dynamic chaotic system 323 with the selected system parameters (S102). When a current chaotic signal sample Z of the received asynchronous chaotic signal sequence 36 comes to the input of the chaotic signal receiving unit 320, the signal sample Z is input to the search unit 321 (S103).

The search unit 321 determines the current point in the phase space (S104). Then, it evaluates and estimates metric proximity of a point corresponding to the received chaotic signal sample Z, to a point belonging to the selected orbit (S105). A norm of the distance between the points in the corresponding phase space may be used as the proximity measure. If the obtained estimate of the metric proximity for the point corresponding to the received signal sample Z to a point of the selected unstable periodic orbit exceeds predetermined limits (S106), the search unit 321 continues the estimating process for other points of the orbit and for points of other orbits belonging to the chaotic attractor (S107). If the obtained estimated proximity does not fall near any points of any orbits in the chaotic attractor, the process returns to step S103 to receive next chaotic signal sample Z.

If the obtained estimate of the metric proximity fits the predetermined limits (S106), the control circuit 327 controls the switch 322 to input the current point through the switch 322 to the selecting dynamic chaotic system 323 and to the orbit control unit 324 (S108).

The orbit control unit 324 starts a step-by-step iterative process (S109). Since the coming signal sample is close to one of points of one of own unstable periodic orbits of the selecting dynamic chaotic system 323, its iterative process starts from the initial point, corresponding to the input sample Z.

In so doing, the orbit control unit 324 stabilizes the iterated unstable periodic orbit by correcting the motion of the depicting point in the phase space of this selecting dynamic chaotic system 323. By the correction process, the parameters of the chaotic system 323 are adjusted to "push" the depicting point of the chaotic system 323 onto the stable manifold of the required orbit corresponding to the sample Z. The output of the selecting dynamic chaotic system 323 is fed to the unit delay element 325 whose output is signal X. The signal X is then fed to the input of the chaotic system 323 and also to the orbit control unit 324. The orbit control unit 324 compares the signal X with stored values of the stabilized orbit. The comparison may be carried out, for example, at each tact or once a period of the stabilized orbit. Thus, the orbit control unit 324 determines the value of the required correction to the controlled parameter of the system 323.

At the same time, the delayed output signal X is compared in the adder 326 to the next signal sample Z of the received asynchronous chaotic signal sequence 36 (S110). If the difference between the compared values is within predetermined limits, i.e. the point corresponding to the new received sample Z is close to the point of the generated orbit for the signal $X_n$ then the iterative process of the chaotic system 323 for the stabilization of the selected orbit is continued (S109). If the next input sample Z is "far" from the corresponding sample X of the stabilized orbit (S110), the control unit 327 moves the switch 322 from the feedback loop 330 to the forward circuit 331 in accordance with the value of deviation beyond the predetermined limit, thus terminating the iterative process of the chaotic system 323 (S111). As a result, the chaotic system 323 transfers into a waiting mode for a new sample Z close to any point of one of the orbits of the unstable periodic orbit set of the chaotic system 323.

In the forward circuit 331, the difference value, i.e., the output error, obtained in the adder 326 is accumulated in the summer 328 during the stabilized cycle period (S112). The comparator 329 compares the total error with a predetermined threshold value to decide that an "own" chaotic signal has come or a "strange" chaotic signal has come (S113).

Figure 36:
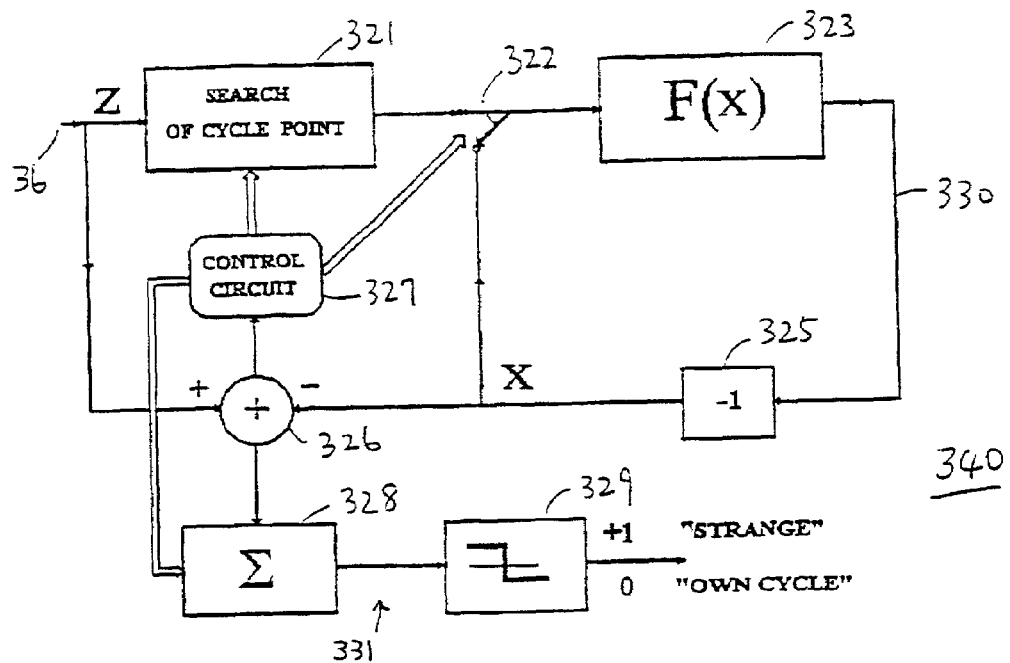
FIG. 36 is a block diagram showing an embodiment of a process for extracting "own" signals from the received signals at the receiver using a direct iterative process.

FIG. 36 represents a block diagram of another embodiment 340 of the chaotic signal receiving unit in accordance with the present invention. The receiving unit 340 is similar to the receiving unit 320 shown in FIG. 34, but the orbit control unit 324 is absent in the receiving unit 340. In this embodiment, the step of stabilizing the selected orbit (the stabilizing step in S109 in FIG. 35) is not performed in the receiving unit 340 since the selected orbit corresponds to an unstable periodic orbit rigorously stabilized at the transmitting side of the communication system. The receiving unit 340 is also suitable in the case when the chaotic signal is generated without stabilizing the orbit at the transmitting side. In the receiving unit 340, a signal sample, whose point in the phase space is close to any point of one of the orbits of the unstable periodic orbit set of the selecting dynamic chaotic system 323, starts its direct iterative process, without stabilizing the selected orbit, when the signal sample is coming at the input of the chaotic system 323. In other relations, the receiving unit 340 operates in the same way as the receiving unit 320 shown in FIG. 34.

Figure 37:
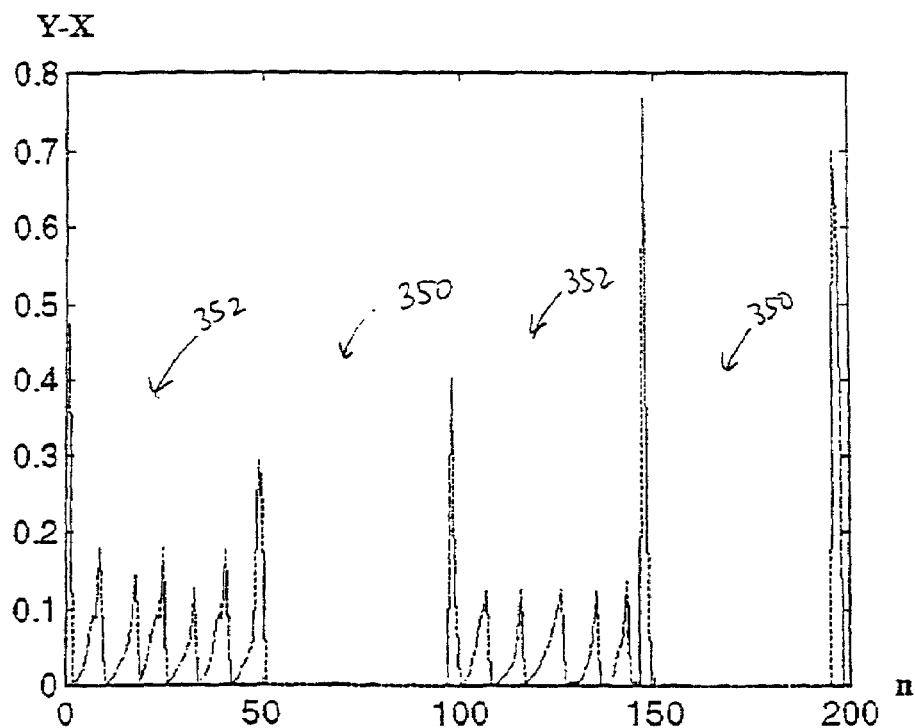
FIG. 37 is a diagram depicting the results of a numerical simulation performed by the receiver shown in FIG. 32.

FIG. 37 depicts the results of a numerical simulation performed in order to demonstrate the features of the receiving unit 320 shown in FIG. 34. As a basic dynamic system generating the chaotic signals, the Lozi map (3) is utilized with parameter values $\alpha=1.4$ and $\beta=0.3$. A chaotic signal sequence 36 is received at the input of the receiving unit 320 of the recipient. The chaotic signal sequence 36 consists of "alien" signals 350 at fragments 0 to 50 and 100 to 150 and "own" signals 352 at sample fragments 50 to 100 and 150 to 200. An "own" repeated signal corresponds to one of the unstable orbits of Lozi map (3) with the period S. As is shown in FIG. 33, in the case of processing "alien" signals by the receiving unit 320, a rapid rise of the "mismatch" 303 of the output signals $Y_1$–$Y_4$ from the cycle points $P_1$–$P_4$ is observed. On the contrary, as shown in FIG. 32, when an "own" signal comes to the input of the receiving unit 320, a matched signal corresponding to the incoming one is formed at its output practically beginning from the second sample $Y_2$. In this example, the "own" signals coming to the input are, first, repeated many times in the aforementioned time intervals and, second, started from an arbitrary point of the orbit with the period-8.

The samples of the received asynchronous chaotic signal sequence 36 may be level quantized, prior to supplying them to the search unit 321. In particular, the samples may be simply binarized.

Referring back to FIG. 29, the selecting dynamic chaotic system 218 of a specific recipient 20 may consist of several parts of the same kind, each tuned at one of the chaotic signals corresponding to the symbols of the set of characters assigned to this recipient 20 in any sender-recipient pair in which this specific recipient 20 takes part. In that case, each of these same parts may be a selecting dynamic chaotic system which may generate one unstable periodic orbit corresponding to one chaotic signal.

When a selecting dynamic chaotic system at the receiving side of a communication system differs in its structure from a dynamic chaotic system at the transmitting side of the communication system, the stabilization of the orbit or the direct iterative process may be performed in the selecting dynamic chaotic system. The selecting dynamic chaotic system may generate all possible orbits or only one of those orbits that are used at the transmitting side of the communication system to form the chaotic signals for the recipient connected to the selecting dynamic chaotic system.

In so doing, the extraction of those orbits may be performed by means of synthesizing special dynamic systems, which systems generate these unstable periodic orbits.

Such dynamic systems may be synthesized, for example, by using piecewise-linear maps with storing information where the corresponding limit orbits are taken as recorded information blocks. Such piecewise-linear maps are disclosed by Dmitriev A. S., Panas A. I., Starkov S. O. in an article entitled "storing and recognition information based on stable orbit of 1-D maps" (Phys. Rev. Lett., 1991, V. 155, N 1, P.494–499); by Dmitriev A., Andreev Yu., Belsky Yu., Kuminov D., Panas A., Starkov S. in U.S. Pat. No. 5,774,587 entitled "Method of object recognition"; and by Yu. A. Andreev, A. S. Dmitriev and S. O. Starkov in an article entitled "Information Processing in 1-D System with Chaos" (IEEE Transaction on Circuits and Systems 1997, Vol. 44, 1, pp. 21–28). The piecewise-linear maps are dynamic systems constructed in a special way, such that the dynamic systems are synthesized in accordance with the type of the stored information. In this case, a limit unstable orbit of the map trajectory is matched to each information block or image.

Figure 38:
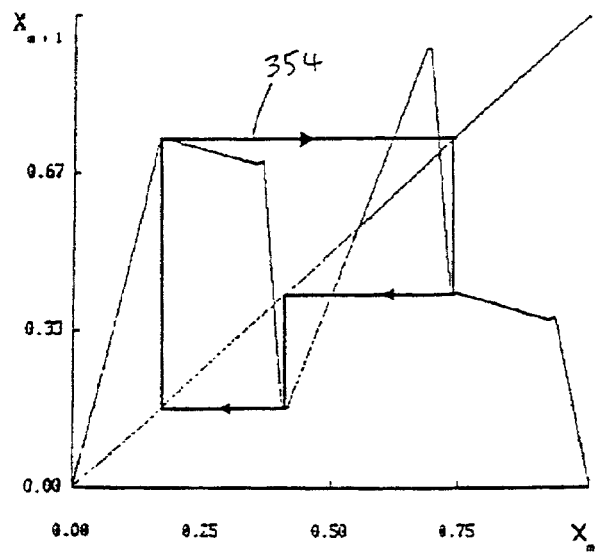
FIG. 38(a) is a diagram showing an example of a period-3 cyclic unstable orbit in a one-dimensional piecewise-linear map.
FIG. 38(b) is a diagram showing another example of a period-3 cyclic unstable orbit in a one-dimensional piecewise-linear map.
Figure 38:
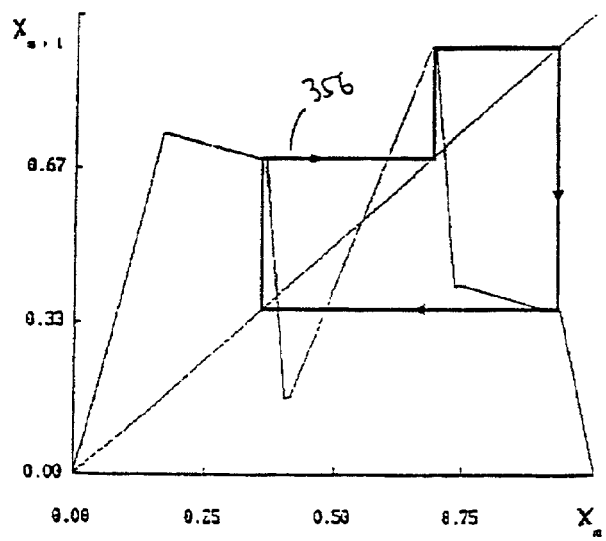

FIGS. 38(a) and 38(b) show an example of a one-dimensional piecewise-linear map in which two orbits with the period 3 are stored. Here, sequences of amplitude samples are stored as the following information blocks:

(first orbit 354 shown in FIG. 38(a))
0.15→0.45→0.75→0.15→0.45→0.75→0.15→ . . .
(second orbit 356 shown in FIG. 38(b))
0.35→0.65→0.95→0.35→0.65→0.95→0 35→ . . . .

Successive iteration of the piecewise-linear map reproduces one of the orbits stored in its memory. The selection of the orbit is determined by the initial conditions for the iteration. By changing the slope of linear sections of the map, it is possible to control the stability of selected orbits. With the slope of the corresponding sections less than 45°, the orbit becomes stable, otherwise the iteration produces a chaotic sequence of samples $\{X_n\}$. The mentioned properties of the maps with stored information permit to use the same map for extracting different unstable orbits.

While extracting signals from the asynchronous chaotic signal sequence, signals to be generated by the selecting dynamic chaotic system of this specific recipient may be pre-selected. This preselecting operation may be carried out based on the phenomenon of the chaotic synchronization consisting in the appearance of an inphase chaotic synchronous response for the pair of identical dynamic chaotic systems. The chaotic synchronization of the master-slave pair may be obtained by introducing, at the receiving side, i.e., the slave system, an additional feedback to perform a weighed summation of the incoming and own signals.

Figure 39:
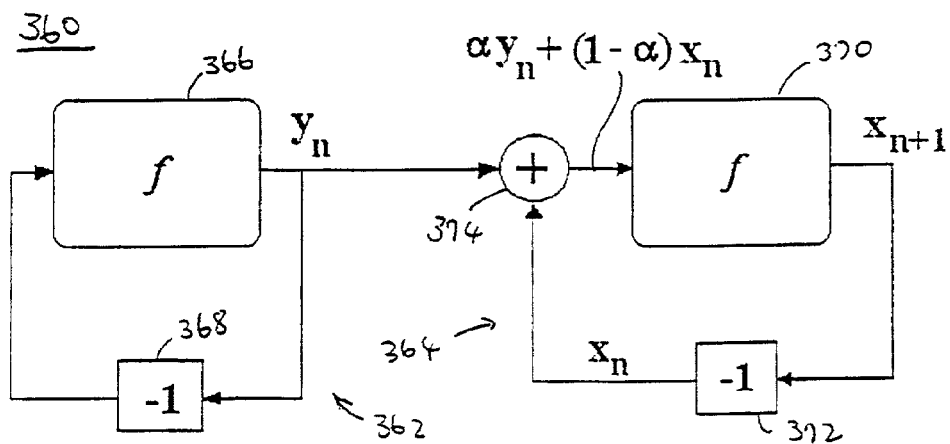
FIG. 39 is a diagram depicting an example of a chaotic synchronization circuit.

As a synchronization circuit, the circuit 360 shown in FIG. 39 may be used. Such a synchronization circuit 360 is described by Dmitriev A. S., Shirokov M., and Starkov S. O. in an article entitled "Chaotic synchronization of ensembles of locally and globally coupled discrete-time dynamical systems. Rigorous results and computer simulation" (Proc. 3-rd Int. Workshop NDES-95, Dublin, Ireland. 1995, pp. 287–290); and by Dmitriev A. S., Shirokov M. E., Starkov S. O. in an article entitled "Chaotic Synchronization in Ensembles of Coupled Maps" (IEEE Transactions on Circuits and Systems, 1997, vol. 44, No. 10, pp. 918–926).

The synchronization circuit 360 comprises an incoming feedback loop 362 and an additional own signal feedback loop 364. The incoming feedback loop 362 has a chaotic function f 366 and a one-delay element 368, and outputs $y_n$. The own signal feedback loop 364 has a chaotic function f 370 and a one-delay element 372, and outputs $x_{n+1}$. An adder 374 is provided to weight by a mixing coefficient $\alpha$ and sum the output $y_n$ of the incoming feedback loop 362 and the output $x_{n+1}$ of the own signal feedback loop 364. Thus, the adder 374 outputs the weighed summation $\alpha y_n + (1-\alpha) x_{n+1}$.

The value of the mixing coefficient $\alpha$ providing the synchronous matched response of the slave system is determined by the system chaotic properties, namely, by the value of the first Lyapunov exponent $\lambda$. For the synchronization circuit 360 shown in FIG. 39, this dependence is defined by the relation:

$$|1-\alpha| < \exp(-\lambda) \qquad (4)$$

In the case when a satisfies the relation (4), the signal at the output of the slave system reproduces exactly the input signal coming from the master system, i.e., the sending side. Since the synchronization is possible only for a pair of the same dynamic systems, the synchronous response is absent when a signal coming into the input of the slave system is formed by other dynamic chaotic systems or by systems having other parameter sets. As a result, it is possible to extract, from the input sequence of chaotic signals, only those fragments that have been formed by the dynamic chaotic system at the transmitting side, which is similar to the dynamic chaotic system at the receiving side of the communication system. Thus, for example, the pre-selection of chaotic signals for recipients or recipient groups is performed by employing the signals (unstable orbits) produced by the same dynamic chaotic system as code characters.

The above embodiments of the chaotic signal receiving units for extracting information from asynchronous chaotic signal sequences may also be realized by digital processing techniques, for instance, digital signal processors which productivity enables generation of a large number of individual chaotic signals corresponding to characters of a large number of users.

While particular embodiments of the present invention have been shown and described, changes and modifications may be made to such embodiments without departing from the true scope of the invention.

For example, the above embodiments are described using a different set of characters to each sender-recipient pair of users. However, the present invention may be also applied to a system in which a different set of characters is assigned to each user, and a message may be sent with identification data identifying a specific user to whom the message is addressed. In this case, a selecting dynamic chaotic system in the specific user may select its "own" signals using the identification data.

In the above embodiments, only one dynamic chaotic system is used in the chaotic signal generating unit. However, more than one dynamic chaotic system may be used to generate different chaotic signals and the outputs of those dynamic chaotic systems may be combined to form a chaotic signal sequence corresponding to a received data from multiple users.

The present invention may be also implemented by a computer processor or similar device programmed to execute the method steps described above, or may be executed by an electronic system which is provided with means for executing these steps.

The present invention also covers a computer readable memory, such as computer diskettes, CD-ROMs, Random Access Memory (RAM) and Read Only Memory (ROM), which stores statements or instructions for use in the execution of the method steps in a computer. As well, electronic signals representing these method steps may also be transmitted via a communication network. Such electronic signals are also within the scope of the present invention.

What is claimed is:

1. A multiple access communicating system including multiple users comprising:
   a chaotic signal generating unit including:
      a data mixer for receiving and mixing said data from multiple users to generate a common data stream;
      a transmitter dynamic chaotic system having at least a variable system of parameter and in its phase space at least a strange attractor comprising a plurality of chaotic trajectories of a depicting point depicting a state of said chaotic system in said phase space, said strange attractor including a set of a countable number of unstable periodic orbits determined by said variable parameter, each unstable orbit having a repetition period of time in which a chaotic trajectory returns to a predetermined neighbourhood of a return point on said unstable periodic orbit;
      a control device for assigning a set of characters to each sender-recipient pair of users, symbols of said characters differing from symbols of characters of at least some other sender-recipient pairs of users, matching one of said unstable orbits to each symbol of each of said characters, successively tuning said dynamic chaotic system to generate chaotic signals which correspond to said unstable orbits corresponding to symbols in said common data stream, and forming an asynchronous chaotic signal sequence from said generated chaotic signals,
   a chaotic signal receiving unit provided for a respective user recipient, said chaotic signal receiving unit including:
      a selecting system tuned at chaotic signals corresponding to symbols of said characters assigned to said respective recipient in any sender-recipient pair of users in which said respective recipient takes part, said selecting system for receiving said asynchronous chaotic signal sequence and extracting from said asynchronous chaotic signal sequence chaotic signals destined for said respective recipient; and
   a communication link connecting said chaotic signal generating unit and said chaotic signal receiving unit:
   wherein said communication system is characterised in that:
   in said chaotic signal generating unit;
      said control device comprises:
         iterative means for carrying out a step-by-step iterative process of said dynamic chaotic system to generate a required chaotic signal corresponding to a current symbol in said common data stream, the iterative means carrying out the step-by-step iterative process in a phase space of the dynamic chaotic system that contains a required unstable periodic orbit that is required in accordance with the required chaotic signal;
         means for stabilizing a current unstable orbit when a trajectory point on said current unstable orbit appeared in said iterative process falls into a predetermined vicinity of said required unstable orbit; and
         means for forming said asynchronous chaotic signal sequence from said stabilized unstable orbits; and
   in said receiving unit:
      the selecting system comprises:
         a selecting dynamic chaotic system provided at said selecting system, said selecting dynamic chaotic system having at least a variable system parameter and at least a strange attractor in its phase space, said strange attractor possessing a set of at least unstable orbits which correspond to said symbols of said characters assigned for said respective recipient; and
         a receiver control unit for performing a step-by-step iterative process of said selecting dynamic chaotic system to generate unstable orbits which correspond to chaotic signals destined for said respective recipient, and extracting said, destined chaotic signals.

2. The multiple access communication system to claim 1, wherein
   said chaotic signal generating unit further comprises a registry for registering a list of said unstable orbits of said strange attractor; and
   said control unit further comprises:
      means for analysing bifurcation characteristics of said transmitter dynamic chaotic system to determine system parameter regions where unstable orbits exist;
      means for searching in said determined parameter regions for unstable orbits having predetermined periods to form said list of said unstable orbits in said registry; and
      means for selecting a subset of said unstable orbits from said list to form said chaotic signals based on said selected unstable orbits.

3. A chaotic signal generating unit for forming chaotic signals for a multiple access communication system, said chaotic signal generating unit comprising:
   a dynamic chaotic system having at least a variable system parameter and in its phase space at least a strange attractor comprising a plurality of chaotic trajectories of a depicting point depicting the state of said chaotic system in said phase space, said strange attractor including a set of a countable number of unstable periodic orbits determined by said system parameter, each unstable orbit having a repetition period of time in which a chaotic trajectory returns to a predetermined neighbourhood of a return point on said unstable orbit
   a control device for controlling said dynamic chaotic system to generate chaotic signals corresponding to a plurality of said unstable orbits which are selected according to predetermined rules;
   said chaotic signal generating unit being characterised in that:
   said chaotic signal generating unit further comprises a registry for registering a list of said unstable orbits of said strange attractor; and
   said control device comprises:
      means for analysing bifurcation characteristics of said dynamic chaotic system to determine system parameter regions where said unstable orbits exist;
      means for searching in said determined parameter regions for unstable orbits having predetermined periods to form said list of said unstable orbits in said registry; and
      means for selecting a subset of said unstable orbits from said list to control said dynamic chaotic system to form said chaotic signals based on said subset of said selected unstable orbits.

4. The chaotic signal generating unit as claimed in claim 3 wherein:
   said chaotic signal generating unit further comprises a data mixer for receiving and mixing data transmitted from multiple users connected to said chaotic signal generating unit, and generating a common data stream; and
   said control device receives said common data stream, and controls said dynamic chaotic system to generate chaotic signals corresponding to said common data stream to form a chaotic signal sequence.

5. A method for forming chaotic signals for multiple access communication, said method comprising the steps of:
   constructing at least one dynamic chaotic system having at least a variable system parameter and at least a strange attractor in its phase space, said strange attractor being a plurality of chaotic trajectories and including a set of a countable number of unstable periodic skeletal orbits determined by said system parameter, each unstable orbit having a repetition period of time in which a chaotic trajectory returns to a predetermined neighbourhood of a return point on said unstable orbit;
   generating chaotic signals corresponding to a plurality of said unstable orbits which are selected according to predetermined rules;
   wherein said method is characterized by the steps of:
   providing, while constructing said dynamic chaotic system, an analysis of bifurcation characteristics of said dynamic chaotic system to reveal parameter regions where said unstable orbits exist;
   carrying out in said revealed parameter regions a search of unstable orbits having predetermined periods;
   forming a list of said unstable orbits found;
   selecting, from said formed list, a subset of said unstable orbits, differences between said unstable orbits satisfying predetermined criteria; and
   forming said chaotic signals by controlling said dynamic chaotic system so that the chaotic signals correspond to said selected unstable skeletal orbits.

6. The method of claim 5, wherein said step of providing said analysis comprises the steps of:
   plotting a bifurcation diagram reflecting behavior modes of said dynamic chaotic system in the whole variable range of said system parameter, and
   determining, based on said bifurcation diagram, said parameter regions where said unstable orbits of said dynamic chaotic system exist.

7. The method of claim 6, wherein said step of plotting said bifurcation diagram is performed by the steps of:
   direct iterating system equations of said dynamic chaotic system on a mesh of values of said system parameter defining said behavior of said dynamic chaotic system; and
   analyzing obtained time series.

8. The method of claim 6, wherein said step of plotting said bifurcation diagram is performed by the steps of:
   numerically integrating system equations of said dynamic chaotic system on a mesh of values of said system parameter defining said behavior of said dynamic chaotic system; and
   analyzing obtained time series.

9. The method of claim 5, wherein said step of carrying out said search comprises the steps of:
   fixing sail system parameter of said dynamic chaotic system;
   selecting one of said chaotic trajectories in said phase space of said dynamic chaotic system by determining start conditions on said strange attractor;
   determining a return point with a period T, to a predetermined neighborhood of which return point said selected chaotic trajectory returns after a predetermined time T;
   solving equations for improving a location of said unstable chaotic orbit with said period T;
   defining characteristics of said unstable chaotic orbit with said period T,
   entering said unstable chaotic orbit in said list as an unstable skeletal orbit with said period T, if said unstable skeletal orbit with said period T is yet absent in said list; and
   continuing said search for other unstable chaotic orbits with said period T.

10. The method of claim 9, wherein said step of continuing said search of other unstable chaotic orbits with said period T is performed on said same chaotic trajectory.

11. The method of claim 9, wherein said step of continuing said search of other unstable chaotic orbits with said period T is performed on other chaotic trajectories.

12. The method of claim 5, wherein said step of selecting said subset of said unstable orbits comprises the step of selecting a subset of chaotic signals of said same period that belong to different attractors of said same dynamic chaotic system having at least two different system parameters.

13. The method of claim 5, wherein said step of selecting said subset of said unstable orbits comprises the step of selecting a subset of chaotic signals of different periods provided in said same dynamic chaotic system.

14. The method of claim 5, wherein said step of selecting said subset of said unstable orbits comprises the steps of selecting a subset of chaotic signals corresponding to unstable skeletal orbits of different dynamic chaotic systems.

15. The method of claim 5, wherein said step of selecting said subset of said unstable orbits comprises the step of selecting a subset of chaotic signals corresponding to unstable skeletal orbits of dynamic chaotic systems having hyper-chaotic attractors.

16. The method of claim 5 further comprising the step of level quantizing said selected chaotic signals.

17. A chaotic signal generating unit for generating a chaotic signal sequence for a multiple access communication system including multiple users transmitting data over said communication system, said chaotic signal generating unit comprising:
  a data mixer for receiving and mixing said date from multiple users to generate a common data stream;
  a dynamic chaotic system having at least a variable system parameter and in this phase space at least a strange attractor comprising a plurality of chaotic trajectories of a depicting point depicting the state of said chaotic system in said phase space, said strange attractor including a set of a countable number of unstable periodic orbits determined by said variable system parameter, each unstable orbit having a repetition period of time in which a chaotic trajectory returns to a predetermined neighbourhood of a return point on said unstable orbit;
  a control device for assigning a set of characters to each sender-recipient pair of users, symbols of said characters differing from symbols of characters of at least some other sender-recipient pairs of users, matching one of said unstable orbits to each symbols of each of said characters, successively tuning said dynamic chaotic system to generate chaotic signals which correspond to unstable orbits corresponding to symbols in said common data stream, and forming an asynchronous chaotic signal sequence from said generated chaotic signals;
  said chaotic signal generating unit being characterised in that:
  said control device comprises:
    iterative means for carrying out a step-by-step iterative process of said dynamic chaotic system to generate a required chaotic signal corresponding to a current symbol in said common data stream, the iterative means carrying out the step-by-step iterative process in a phase space of the dynamic chaotic system that contains a required unstable periodic orbit that is required in accordance with the required chaotic signal;
    means for stabilizing a current unstable orbit when a trajectory point on said current unstable orbit appeared in said iterative process falls into a predetermined vicinity of said required unstable periodic orbit to form a stabilized unstable orbit; and
    means for forming said asynchronous chaotic signal sequence from said stabilized unstable orbit.

18. The chaotic signal generating unit of claim 17, wherein
  said chaotic signal generating unit further comprises a registry for registering a list of said unstable orbits of said strange attractor; and
  said control unit further comprises:
    means for analysing bifurcation characteristics of said dynamic chaotic system to determine system parameter regions where unstable orbits exist;
    means for searching in said determined parameter regions for unstable orbits having predetermined periods to form said list of said unstable orbits in said registry; and
    means for selecting a subset of said unstable orbits from said list to form said chaotic signals corresponding to said unstable orbits.

19. A method for forming an asynchronous data stream for a multiple access communication system including multiple users communicating data therebetween, said method comprising the steps of:
  assigning in advance a set of characters to each sender-recipient pair of users, symbols of said characters differing from symbols of characters of at least some other sender-recipient pairs of users;
  matching, to each symbol of each of said characters, one of chaotic signals generated by a dynamic chaotic system having at least a variable system parameter and in its phase spaces at least a strange attractor comprising a plurality of chaotic trajectories of a depicting point depicting a state of said chaotic system in the phase space, said strange attractor including a set of a countable number of unstable orbits determined by said system parameter, each unstable orbit having a repetition period of time in which a chaotic trajectory returns to a predetermined neighbourhood of a return on said unstable orbit;
  receiving, from multiple users, data consisting of symbols of characters of said users;
  forming a common data stream from said symbols being received from said users, in which sequence a symbol following order is defined in accordance with a predetermined rule;
  successively tuning said dynamic chaotic system to generate chaotic signals, each of which corresponds to a respective symbol in said common data steam;
  forming, in a communication channel, an asynchronous chaotic signal sequence from said chaotic signals generated successively,
  wherein said method is characterized in that said stop of successively tuning comprises the steps of;
  starting a step-by-step iterative process of said dynamic chaotic system to generate a required chaotic signal corresponding to a currant symbol in said common data stream;
  stabilizing a current unstable orbit when a trajectory point on said current unstable orbit appeared in said iterative process falls into a predetermined vicinity of said required unstable orbit; and
  forming said asynchronous chaotic signal sequence from said stabilized unstable orbit.

20. The method of claim 19, further comprising, during said iterative process of said dynamic chaotic system and prior to said step of stabilizing, the step of finding a point in said phase space of said dynamic chaotic system which belongs to said required unstable orbit, and which is metrically and evolutionally close to a current point reflecting said current state of said dynamic chaotic system.

21. The method of claim 19, wherein said step of starting said iterative process of said dynamic chaotic system is performed by changing initial conditions of said dynamic chaotic system, and starting said iterative process from a phase space point belonging to said required unstable orbit.

22. The method of claim 19, wherein said step of stabilizing said unstable orbit is performed by changing said system parameter of said dynamic chaotic system, and moving a current point reflecting said current state of said dynamic chaotic system on a stable manifold of said required unstable orbit.

23. The method of claim 22, wherein said step of changing of said system parameter of said dynamic chaotic system is performed by correcting a point movement in said phase space at least once in said iterative process during said period of said unstable orbit.

24. The method of claim 23, wherein said step of correcting said point motion in said phase space is performed on each iterative step during said period of said unstable orbit.

25. The method of claim 19, wherein said step of forming said common data stream is performed in order of said data coming from said users.

26. The method of claim 19, wherein said step of forming said common data stream is performed in view of priorities pre-assigned to each character.

27. The method of claim 19, wherein said step of forming said common data stream is performed in view of priorities pre-assigned to each user.

28. The method of claim 19, wherein said step of forming said common data stream is performed in view of transmission of a predetermined number of symbols per time unit for each priority user.

29. The method of claim 19, wherein said step of forming said common data stream is performed in view of transmission of a predetermined number of symbols per time unit for each priority character.

30. The method of claim 19, wherein said step of assigning a set of characters comprises the step of assigning to each priority user a set of characters having more symbols than a set of characters assigned to each of other users.

31. The method of claim 19, wherein said step of matching chaotic signals comprises the step of providing each priority user with several chaotic signals on each symbol of each character.

32. The method of claim 19, wherein said step of matching chaotic signals comprises the step of providing each priority user with chaotic signals having shorter unstable orbit period than chaotic signals for each of other users.

33. The method of claim 19, wherein said step of matching chaotic signals comprises the step of providing each priority character with chaotic signals having shorter unstable orbit period than chaotic signals for each of other characters.

34. The method of claim 19, wherein, in order to transmit at least one symbol, said step of generating said corresponding chaotic signal is performed more than once.

35. A chaotic signal generating unit as claimed in claim 3, wherein a set of characters represented by a set of symbols is assigned to each user, and said registry stores relationship of each symbol and each chaotic signal formed using at least a part of said unstable orbits.

36. A chaotic signal generating unit as claimed in claim 4, wherein said users include in its data a priority data indicating priority of said data, and said data mixer mixes said data based on said priority data.

37. A chaotic signal generating unit as claimed in claim 36, wherein higher priority data uses a unstable orbit having a shorter repetition period than that of lower priority data.

38. A chaotic signal receiving unit for extracting chaotic signals destined for a respective recipient from an asynchronous chaotic signal sequence in a multiple-access communication system, said asynchronous chaotic signal sequence including chaotic signals, said chaotic signal corresponding to symbols of characters assigned to communicating sender-recipient pairs of users in said communication system, symbols of characters of a particular sender-recipient pair of users differing from symbols of characters of at least some other sender-recipient pairs, each chaotic signal corresponding to an unstable periodic orbit generated by a transmitter dynamic chaotic system having at least a variable system parameter and in its phase space at least a strange attractor comprising a plurality of chaotic trajectories of a depicting point depicting the state of said chaotic system in said phase space, said strange attractor including a set of a countable number of unstable orbits determined by said system parameter, each unstable orbit having a repetition period of time in which a chaotic trajectory returns to a predetermined neighbourhood of a return point on said unstable orbit, said receiving unit comprising:

a selecting system tuned at chaotic signals corresponding to symbols of characters assigned for said respective recipient in any sender-recipient pair in which said respective recipient takes part, said selecting system for receiving said asynchronous chaotic signal sequence and extracting from said asynchronous chaotic signal sequence said chaotic signals destined for said respective recipient;

wherein said receiving unit is characterized in that:

a selecting dynamic chaotic system provided at said selecting system, said selecting dynamic chaotic system having at least a variable system parameter and at least a strange attractor in its phase space, said strange attractor possessing a set of at least unstable orbits which correspond to said symbols of said characters assigned for said respective recipient; and a receiver control unit for performing a step-by-step iterative process of said selecting dynamic chaotic system to generate unstable orbits which correspond to chaotic signals destined for said respective recipient, and extracting said destined chaotic signals.

39. A method for extracting chaotic signals destined for a specific recipient from an asynchronous chaotic signal sequence in a multiple-access communication system, said asynchronous chaotic signal sequence including chaotic signals, said chaotic signal corresponding to symbols of characters assigned to sender-recipient pairs of users in said communication system, symbols of characters of a particular sender-recipient pair of users differing from symbols of characters of at least some other sender-recipient pairs, each chaotic signal corresponding to an unstable periodic orbit generated by a transmitter dynamic chaotic system having at least a variable system parameter and in its phase space at least a strange attractor comprising a plurality of chaotic trajectories of a depicting point depicting the state of said chaotic system in said phase space, said strange attractor including a set of a countable number of unstable orbits determined by said variable system parameter, each unstable orbit having a repetition period of time in which a chaotic trajectory returns to a predetermined neighbourhood of a return point on said unstable orbit, the method comprising the steps of:

providing each recipient with a selecting system tuned at chaotic signals corresponding to symbols of characters assigned for said specific recipient in any sender-recipient pair in which said specific recipient takes part;

receiving said asynchronous chaotic signal sequence; and extracting from said asynchronous chaotic signal sequence, said chaotic signals destined for said specific recipient by said selecting system;

wherein said method is characterized by the steps of:

providing said selecting system with a selecting dynamic chaotic system, said selecting dynamic chaotic system having at least a variable system parameter and at least a strange attractor in its phase space, said strange attractor possessing a set of at least unstable orbits which correspond to said symbols of said characters assigned for said respective recipient; and performing said step of extracting said chaotic signals by performing a step-by-step iterative process of said selecting dynamic chaotic system to generate said unstable orbits corresponding to said chaotic signals destined for said specific recipient.

40. The method of claim 39, wherein said step of extracting said chaotic signals further comprises the step of stabilizing said unstable orbit corresponding to a chaotic signal in said selecting dynamic chaotic system of said specific recipient by appropriately tuning said system parameter of said selecting dynamic chaotic system during said step-by-step iterative process.

41. The method of claim 40, wherein said step of stabilizing comprises the steps of:

estimating, in said phase space of said selecting dynamic chaotic system, a metric proximity of a point corresponding to a received sample of said asynchronous chaotic signal sequence, to points corresponding to each of said unstable orbits belonging to said selecting dynamic chaotic system;

starting said step-by-step iterative process of said selecting dynamic chaotic system at an unstable orbit having a point whose metric proximity estimate is within a predetermined range;

correcting a point motion in said phase space of said selecting dynamic chaotic system on at least one step of said iterative process during a repetition period of said iterated unstable orbit;

further estimating, during said iterative process at each iterative step in said phase space of said selecting dynamic chaotic system, a next metric proximity of a point corresponding to a next received sample of said asynchronous chaotic signal sequence, to a next point of said iterated unstable orbit; and terminating said iterative process once said next metric proximity estimate falls outside said predetermined range.

42. The method of claim 41, wherein said step of correcting said point motion is performed at every step of said iterative process of said selecting dynamic chaotic system.

43. The method of claim 39, wherein said step of extracting said chaotic signals further comprises the steps of:

estimating, in said phase space of said selecting dynamic chaotic system, a metric proximity of a point corresponding to a received sample of said asynchronous chaotic signal sequence, to points corresponding to each of said unstable orbits belonging to said selecting dynamic chaotic system;

starting said step-by-step iterative process of said selecting dynamic chaotic system at an unstable orbit having a point whose estimated metric proximity is within a predetermined range;

further estimating, during said iterative process at each iterative step in said phase space of said selecting dynamic chaotic system, a next metric proximity of a point corresponding to a next received sample of said asynchronous chaotic signal sequence, to a next point of said iterated unstable orbit; and terminating said iterative process once said next metric proximity estimation falls outside said predetermined range.

44. The method of claim 43, wherein said selecting dynamic chaotic system is similar to said transmitter dynamic chaotic system of said communication system, and tuned to extract only those unstable orbits which are used by said transmitter dynamic chaotic system for forming chaotic signals for said specific recipient.

45. The method of claim 43, wherein:

said selecting dynamic chaotic system is different from said transmitter dynamic chaotic system of said communication system, and possesses periodic orbits that are used at said transmitter dynamic chaotic system; and said step of extracting said chaotic signals further comprises the step of synthesizing said selecting dynamic chaotic system with said transmitter dynamic chaotic system.

46. The method of claim 39, wherein said step of extracting said chaotic signals is performed by using multiple selecting dynamic chaotic systems, each of which is tuned to extract a respective one of said chaotic signals for said specific recipient.

47. The method of claim 43, wherein said step of extracting said chaotic signals comprises the steps of:

accumulating said metric proximity estimates during a time interval corresponding to said duration of one repetition of said iterated unstable orbit, and making a decision on extraction of said chaotic signal when said accumulated value does not exceed a predetermined threshold.

48. The method of claim 39, wherein said step of extracting said chaotic signals further comprises the step of quantizing amplitude of said chaotic signals in said asynchronous chaotic signal sequence.

49. The method of claim 39, wherein said step of extracting said chaotic signals further comprises the step of pre-selecting chaotic signals in said asynchronous chaotic signal sequence, for which a type of said selecting dynamic chaotic system differs from types of selecting dynamic chaotic systems of other recipients.

50. The method of claim 39, wherein said step of extracting said chaotic signals further comprises the step of pre-selecting chaotic signals in said asynchronous chaotic signal sequence, for which a system parameter set of said selecting dynamic chaotic system differs from parameter sets of selecting dynamic chaotic systems of other recipients.

* * * * *

UNITED STATES PATENT AND TRADEMARK OFFICE
CERTIFICATE OF CORRECTION

PATENT NO. : 6,999,445 B1
APPLICATION NO. : 09/979834
DATED : February 14, 2006
INVENTOR(S) : Dmitriev et al.

It is certified that error appears in the above-identified patent and that said Letters Patent is hereby corrected as shown below:

Column 27,
Line 44, after "mixing" delete "said".
Line 47, after "system" delete "of".
Line 67, after "signals" delete "," and insert -- ; --.

Column 28,
Line 16, after "unit" delete ";" and insert -- : --.
Line 49, after "said" delete ",".
Line 51, after "system" delete "to" and insert -- of --.

Column 29,
Line 13, after "orbit" insert -- ; --.

Column 30,
Line 32, delete "sail" and insert -- said --.
Line 67, after "comprises the" delete "steps" and insert -- step --.

Column 31,
Line 16, after "mixing" delete "said".
Line 16, delete "date" and insert -- data --.
Line 19, delete "this" and insert -- its --.
Line 33, delete "symbols" and insert -- symbol --.

Column 32,
Line 19, delete "spaces" and insert -- space --.
Line 23, after "unstable" insert -- periodic --.
Line 26, after "return" insert -- point --.
Line 36, delete "steam;" and insert -- stream; --.
Line 41, after "said" delete "stop" and insert -- step --.
Line 42, after "steps of" delete ";" and insert -- : --.
Line 45, delete "currant" and insert -- current --.
Line 56, after "system" insert -- -, --.

UNITED STATES PATENT AND TRADEMARK OFFICE
CERTIFICATE OF CORRECTION

PATENT NO. : 6,999,445 B1
APPLICATION NO. : 09/979834
DATED : February 14, 2006
INVENTOR(S) : Dmitriev et al.

It is certified that error appears in the above-identified patent and that said Letters Patent is hereby corrected as shown below:

Column 33,
Line 59, after "uses" delete "a" and insert -- an --.

Signed and Sealed this

Eleventh Day of July, 2006

JON W. DUDAS
*Director of the United States Patent and Trademark Office*